US010142477B2

(12) United States Patent
Khodorenko et al.

(10) Patent No.: US 10,142,477 B2
(45) Date of Patent: *Nov. 27, 2018

(54) SYSTEM AND METHOD FOR SOCIAL MESSAGE CLASSIFICATION BASED ON INFLUENCE

(71) Applicant: Genesys Telecommunications Laboratories, Inc., Daly City, CA (US)

(72) Inventors: Alex Khodorenko, Walnut Creek, CA (US); Vladimir Pimtchenkov, Pleasant Hill, CA (US); Sergey B. Belov, Walnut Creek, CA (US); Yevgeniy Petrovykh, Walnut Creek, CA (US); Patrick Mackey, San Francisco, CA (US); Arne Stoertenbecker, Mannheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,401

(22) Filed: Nov. 14, 2016

(65) Prior Publication Data
US 2017/0126891 A1     May 4, 2017

Related U.S. Application Data

(63) Continuation of application No. 13/708,915, filed on Dec. 7, 2012, now Pat. No. 9,497,289.

(51) Int. Cl.
| *H04M 3/523* | (2006.01) |
| *H04L 29/08* | (2006.01) |
| *H04L 12/58* | (2006.01) |
| *H04M 3/42* | (2006.01) |
| *H04M 3/51* | (2006.01) |

(52) U.S. Cl.
CPC ......... *H04M 3/5232* (2013.01); *H04L 51/32* (2013.01); *H04L 67/306* (2013.01); *H04L 67/325* (2013.01); *H04M 3/42068* (2013.01); *H04M 3/5191* (2013.01)

(58) Field of Classification Search
CPC ....... G06Q 50/01; H04L 51/32; H04M 3/5232
USPC .................................................... 379/265.11
See application file for complete search history.

(56) References Cited

U.S. PATENT DOCUMENTS

| 6,121,178 A | 9/2000 | Eshima et al. |
| 6,212,178 B1 | 4/2001 | Beck et al. |
| 2006/0095976 A1 | 5/2006 | Torres et al. |
| 2007/0198510 A1* | 8/2007 | Ebanks .................. G06Q 30/02 707/999.005 |

(Continued)

FOREIGN PATENT DOCUMENTS

| KR | 1020080035153 A | 4/2008 |
| WO | 0223877 A2 | 3/2002 |
| WO | 2014089539 A1 | 6/2014 |

OTHER PUBLICATIONS

International Search Report for PCT/US2013/073748, dated Mar. 20, 2014, 4 pages.

(Continued)

*Primary Examiner* — Nafiz E Hoque

(57) ABSTRACT

A method for prioritizing processing of interactions at a contact center, the method including: identifying an interaction to be prioritized for processing; identifying a person associated with the interaction; identifying an influence level of the person associated with the interaction; and prioritizing the interaction for processing based on the influence level of the person associated with the interaction.

19 Claims, 24 Drawing Sheets

(56) References Cited

U.S. PATENT DOCUMENTS

| | | |
|---|---|---|
| 2008/0108360 A1 | 5/2008 | Baarman et al. |
| 2009/0144612 A1 | 6/2009 | Ishii et al. |
| 2009/0171752 A1 | 7/2009 | Galvin et al. |
| 2010/0158236 A1 | 6/2010 | Chang et al. |
| 2010/0246797 A1 | 9/2010 | Chavez et al. |
| 2011/0194681 A1 | 6/2011 | Fedorov et al. |
| 2013/0051544 A1* | 2/2013 | Ross ............... G06Q 50/01 379/265.02 |
| 2014/0074728 A1* | 3/2014 | Margulies ......... G06Q 30/01 705/304 |
| 2014/0164502 A1 | 6/2014 | Khodorenko et al. |
| 2014/0164530 A1 | 6/2014 | Stoertenbecker |

OTHER PUBLICATIONS

Pusher Integration for Web and Mobile Journey Tracking, Nov. 20, 2013, CxEngage Product Updates, Copyright 2013, UserEvents, Inc., 1 page.

Retrieve at http://klout.com/s/business, Apr. 24, 2014, 2 pages.

Socia Media Marketing retrieved at http://www.salesforcemarketingcloud.com/products/social-media-listening/, Apr. 24, 2014, 12 pages.

European Patent Office action for Application No. 13860520.9, dated Feb. 20, 2017, 4 pages.

\* cited by examiner

SYSTEM AND METHOD FOR SOCIAL MESSAGE CLASSIFICATION BASED ON INFLUENCE

CROSS-REFERENCE TO RELATED APPLICATIONS

This application is a continuation of U.S. patent application Ser. No. 13/708,915, filed on Dec. 7, 2012, now U.S. Pat. No. 9,497,289, the disclosure of which is incorporated herein by reference in its entirety.

FIELD

Embodiments of the present invention are directed to systems and methods for operating contact centers and, more particularly, to systems and methods for contact centers to monitor the social media landscape and to engage with customers via social media channels.

BACKGROUND

Social media is gaining more and more prevalence in the business landscape with significant consequences for the businesses community. Online social media sites like Facebook and Twitter each have a large membership base. A public post by a member of one of these social sites can be quickly shared and viewed by many users online. This has significant implications for business marketing and brand management. A satisfied customer can help promote a service or product by posting a glowing review online, or negatively impact a business via a negative comment.

Accordingly, what is desired is a system and method that allows a business to monitor the social media landscape for posts, mentions, conversations, blogs, and other chatter (generally referred to as posts or social media interactions) about the business to determine whether the business is to respond to such posts by, for example, engaging in conversation with the authors of such posts. To facilitate such engagement, it is further desired for the system and method to enable the business to interact with an author of a post via the same social media channel, and to switch to another media channel where it would be more desirable to continue the interaction via the different media channel. However, customer contact centers often do not have access to users' social media identifiers (e.g. Twitter handle, Facebook ID, or the like), and thus, there is no link between such social media identifiers and information typically stored in a customer relation database (e.g. customer's account number, email address, phone number, and the like). Accordingly, it is desirable to make the link between the original social media interaction and the new interaction when switching to the new interaction channel.

SUMMARY

According to one embodiment, a method for prioritizing processing of interactions at a contact center, the method comprising: identifying an interaction to be prioritized for processing; identifying a person associated with the interaction; identifying an influence level of the person associated with the interaction; and prioritizing the interaction for processing based on the influence level of the person associated with the interaction.

According to one embodiment, the interaction is a message posted on a social media channel.

According to one embodiment, the person associated with the interaction is an author of the message.

According to one embodiment, the influence level is based on a size of the person's online social media network.

According to one embodiment, the size of the person's online social media network is based on a number of people directly or indirectly connected to the person via the online social media network.

According to one embodiment, the prioritizing is further based on one or more of actionability of the interaction, sentiment of the interaction, or the business value of the person associated with the interaction.

According to one embodiment, the prioritizing includes ignoring an interaction when the influence level is below a preset threshold.

According to one embodiment, a method for distributing interactions to contact center agents, the method including: identifying an interaction to be distributed to a contact center agent; identifying a person associated with the interaction; identifying an influence level of the person associated with the interaction; identifying one or more contact center agents; and distributing the interaction to one of the one or more contact center agents based on the influence level of the person associated with the interaction.

According to one embodiment, the interaction is a message posted on a social media channel.

According to one embodiment, the person associated with the interaction is an author of the message.

According to one embodiment, the influence level is based on a size of the person's online social media network.

According to one embodiment, the size of the person's online social media network is based on a number of people directly or indirectly connected to the person via the online social media network.

According to one embodiment, the distributing further includes distributing the interaction to an agent in a first agent group when the influence level is equal to or higher than a preset threshold, and to an agent in a second agent group when the influence level is below the preset threshold.

According to one embodiment, the distributing is further based on one or more of actionability of the interaction, sentiment of the interaction, or the business value of the person associated with the interaction.

According to one embodiment, the distributing includes ignoring the interaction when the influence level is below a preset threshold.

According to one embodiment, a system for prioritizing interactions and distributing interactions to contact center agents, the system including: a processor; and a memory, wherein the memory has stored thereon instructions that, when executed by the processor, cause the processor to: identify an interaction to be prioritized and distributed to a contact center agent; identify a person associated with the interaction; identify an influence level of the person associated with the interaction; identify one or more contact center agents; prioritize the interaction for distribution based on the influence level of the person associated with the interaction; and distribute the interaction to one of the one or more contact center agents based on the influence level of the person associated with the interaction.

According to one embodiment, the interaction is a message posted on a social media channel.

According to one embodiment, the person associated with the interaction is an author of the message.

According to one embodiment, the influence level is based on a size of the person's online social media network.

According to one embodiment, the size of the person's online social media network is based on a number of people directly or indirectly connected to the person via the online social media network.

As is readily apparent, providing a business the capability to monitor the social media landscape for messages and comments that are relevant to the business's products and brand and enabling it to engage authors of such posts through social media tools may allow the business to improve its brand recognition and reputation online and potentially limit the effect of online posts that may tarnish its brand image.

As a person of skill in the art will appreciate, enabling an agent to seamlessly communicate across channels while preserving a link to the original message and giving the agent access to a customer's profile and interaction history information may help to expedite and improve the overall quality of the customer service provided by the contact center agent and, as a result, positively impact the business supported by the contact center.

These and other features, aspects, and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 3d is a screen shot of a GUI rendered upon delivery of a social post to an agent's desktop, further depicting a feature of the interaction workspace that enables an agent to send a direct response to a tweeted post from within the interaction workspace, according to an embodiment of the present invention;

FIG. 4b is a screen shot of a GUI rendered upon delivery of a Facebook post to an agent's desktop, further depicting the additional data on the original author and post, according to an embodiment of the present invention;

FIG. 4c is a screen shot of a GUI rendered upon delivery of a Facebook post to an agent's desktop, further depicting the additional data on the wall where the message was posted, according to an embodiment of the present invention;

DETAILED DESCRIPTION

Figure 1A:
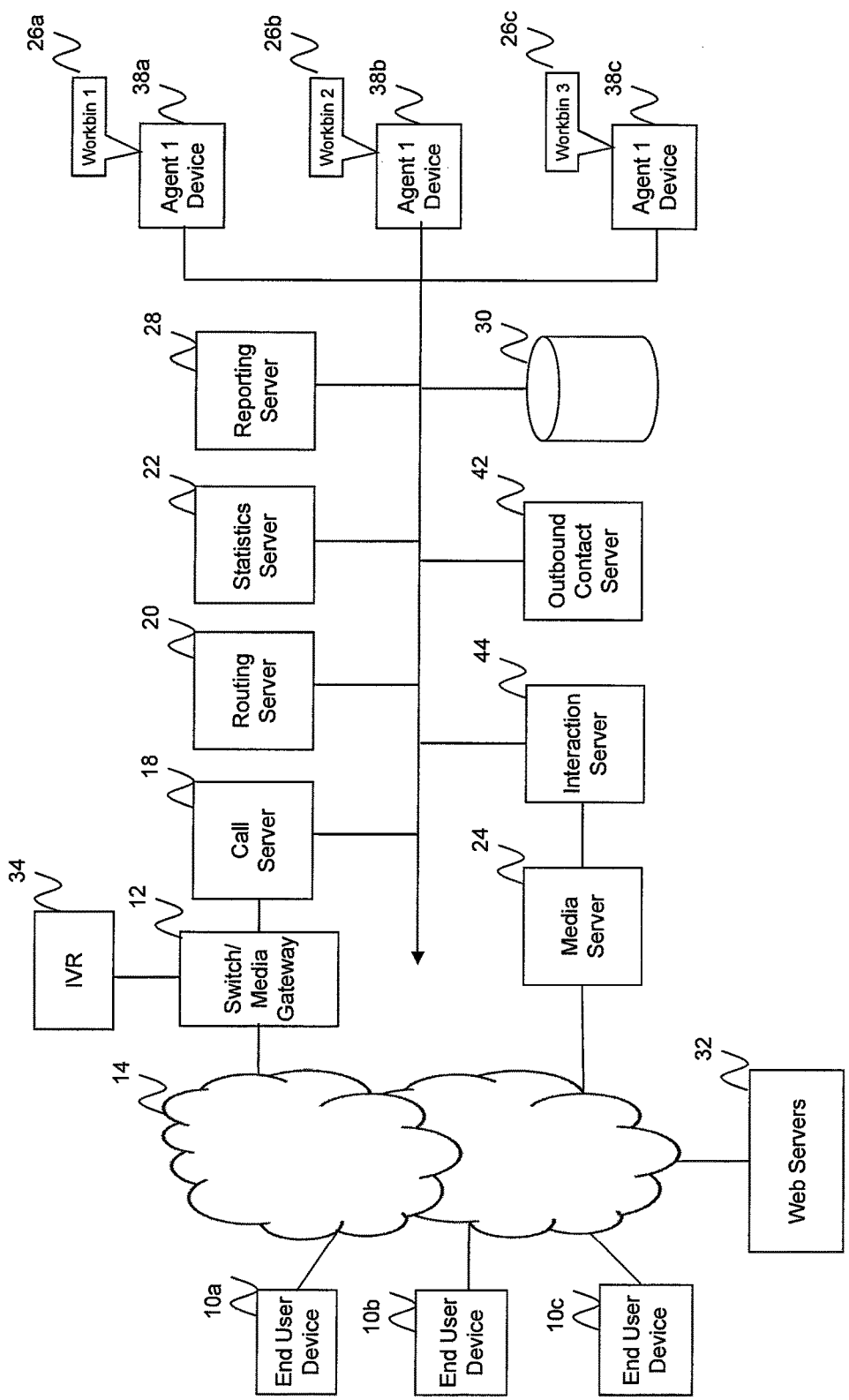
FIG. 1a is a schematic block diagram of a system supporting a contact center that is configured to route incoming and outgoing customer activity to customer service agents, according to some exemplary embodiments.

In the following detailed description, only certain exemplary embodiments of the present invention are shown and described, by way of illustration. As those skilled in the art would recognize, the invention may be implemented in many different forms and should not be construed as being limited to the embodiments set forth herein. Like reference numerals designate like elements throughout the specification.

In general terms, embodiments of the present invention are directed to a system and method for providing contact center services for different business enterprises and government entities, which enable such organizations to effectively integrate social media dialogues and information into their customer service infrastructures. To that end, media servers monitor an organization's social accounts (e.g. the Twitter account(s) and Facebook page(s) associated with the organization) and query posts that mention, for example, the organization's name, products, and/or brands from social site application programming interfaces (APIs) at preset time intervals. Returned messages are then analyzed, categorized, and prioritized based on the business's social media policies and/or objectives. Natural language processing may be used to review the messages for actionability (e.g. a customer looking for assistance) and sentiment (e.g. positive, negative, or neutral in tone).

According to an embodiment of the present invention, a message's actionability and sentiment as well as the author's business value to the organization and level of influence in the social sphere may be determined and used in prioritizing and distributing interactions to agents. According to one aspect, an author's level of influence may be gauged using information provided by a third-party influence service such as Klout (http://klout.com). The prioritized messages are then distributed to contact center agents who may engage the messages' authors as necessary. According to an embodiment of the present invention, an agent may access a desktop component providing an interaction workspace for a consolidated, cross-channel view of the author's profile information and interaction history with the organization, and gain access to standard responses and/or the organization's knowledge base. This allows the agent to "connect the dots" and provide a correct, consistent reply to the customer.

During a communication between an agent and a customer, it may be desirable to escalate the conversation to a different media channel. Such a change may be prompted by an opportunity to exchange private information or a desire for a more extensive dialogue uninhibited by channel related constraints such as, for example, character limitations (e.g. 140 characters that are allowed for Twitter messages). In such a scenario, the customer is typically asked to call in, send an email, or initiate a web chat from the company's web page. In so doing, the customer often has to manually change applications and/or devices and manually initiate the new interaction. This often results in a loss of connection to the previous interaction and therefore the customer is treated generically, i.e., given no special priority or chance of last agent routing and may face a potentially long queue time and have to repeat his/her identifying information to a newly assigned agent. Furthermore, if the customer identification information used for the social media interaction is not available to the contact center (e.g. in a customer relations management database), the contact center may not be able to associate the prior social media communication to the current inbound interaction for which a different identification information is provided. In this case, the newly assigned agent may not have any context of the earlier social media communication. According to embodiments of the present invention, cross-channel communication provides a convenient way to transition from one communication channel to another one, without losing the context of the conversation or the author's identification information.

FIG. 1a is a schematic block diagram of a system supporting a contact center that is configured to route incoming and outgoing customer activities to customer service agents, according to some exemplary embodiments. The contact center may be an in-house facility to a business or corporation for serving the enterprise in performing the functions of sales and service relative to the products and services available through the enterprise. In another aspect, the contact center may be a third-party service provider. The contact center may be hosted in equipment dedicated to the enterprise or third-party service provider, and/or hosted in a remote computing environment such as, for example, a private or public cloud environment with infrastructure for supporting multiple contact centers for multiple enterprises.

According to some exemplary embodiments, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users desiring to receive services from the contact center may initiate inbound interactions with the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions. In this regard, the end user devices 10 may be equipped with a web browser or other like application for accessing information over the World Wide Web.

Inbound and outbound interactions from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch and the remainder of the routing, monitoring, and other call-handling systems of the contact center.

The contact center may also include a multimedia/social media server 24 for engaging in media interactions other than voice interactions with the end user devices 10 and/or web servers 32. The media interactions may be related, for example, to email, vmail (voice mail through email), chat, video, text-messaging, web, social media, screen-sharing, and the like. The web servers 32 may include, for example, social interaction site hosts for a variety of known social interaction sites to which an end user may subscribe, such as, for example, Facebook, Twitter, LinkedIn, Pinterest, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to some exemplary embodiments of the invention, the switch is coupled to an interactive voice response (IVR) server 34. The IVR server 34 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

If the incoming interaction, henceforth referred to as incoming customer activity, is to be routed to an agent, the call server 18 will interact with a routing server 20 for finding the most appropriate agent for processing the incoming activity. The call server 18 may be configured to process PSTN calls, VoIP calls, and the like. For example, the call server 18 may include a session initiation protocol (SIP) server for processing SIP calls. According to some exemplary embodiments, the call server 18 may, for example, extract data about the customer interaction such as the caller's telephone number, often known as the automatic number identification (ANI) number, or the customer's internet protocol (IP) address, or email address.

In some embodiments, the call server 18 may also query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, and SQLite, and may be stored in a mass storage device 30. The call server 18 may query the customer information from the customer database via an ANI or any other information collected by the IVR 34. The information may then be relayed to the agent device 38 of the agent who is processing the call.

In one example, while an agent is being located and until such agent becomes available, the call server 18 may place an incoming customer activity in, for example, a customer activity queue. The activity queue may be implemented via any data structure conventional in the art, such as, for example, a linked list, array, and/or the like. The data structure may be maintained, for example, in buffer memory provided by the call server 18.

Once an appropriate agent is available to handle a customer activity, the activity may be removed from the customer activity queue and transferred to a corresponding agent device 38a-38c (collectively referenced as 38). Collected information about the customer and/or the customer's historical information from the customer database may also be provided to the agent device for aiding the agent in better servicing the call. In this regard, each agent device 38 may include a telephone adapted for regular telephone calls, VOID calls, and the like. The agent device 38 may also include a computer for communicating with one or more servers of the contact center and performing data processing associated with contact center operations and for interfacing with customers via a variety of communication mechanisms such as chat, instant messaging, voice calls, and the like.

The selection of an appropriate agent for routing an inbound or outbound customer activity may be based, for example, on a routing strategy employed by the routing server 20, and based on information about agent availability, skills, preferences, and other routing parameters provided, for example, by a statistics server 22.

According to some exemplary embodiments, the media servers 24 may be configured to detect user presence on different websites including social media sites, and may also be configured to monitor and track interactions on those websites.

The contact center may also include a reporting server 28 configured to generate reports from data aggregated by the statistics server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to some exemplary embodiments of the invention, the routing server 20 is enhanced with functionality for managing back-office/offline activities that are assigned to the agents. Once assigned to an agent, an activity may appear in the agent's workbin 26a-26c (collectively referenced as 26) as a task to be completed by the agent. The agent's workbin may be implemented via any data structure conventional in the art, such as, for example, a linked list, array, and/or the like. The workbin may be maintained, for example, in buffer memory of each agent device 38. The activity may also be pushed to the agent device via, for example, a pop-up message, for acceptance or refusal in real time.

According to some exemplary embodiments, in addition to storing agent preference data, the mass storage device 30 also stores data related to contact center operation such as, for example, information related to agents, customers, customer activities, and the like. The mass storage device may take form of a hard disk or disk array as is conventional in the art.

According to some exemplary embodiments, the system also includes an outgoing contact server (OCS) 42 for scheduling, initiating, and/or managing, outgoing interactions. For example, the OCS may store an outgoing contact list and may interface with the routing server 20 to enable an agent to partake in an outgoing activity to, for example, upsell current customers, solicit new businesses, seek donations for charitable organizations, or reach out to customers who have requested technical assistance. According to some embodiments, the OCS 42 may further interact with the IVR 34 for placing outgoing calls.

The various servers of FIG. 1a may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art will recognize that the functionality of various servers may be combined or integrated into a single server, or the functionality of a particular server may be distributed across one or more other servers without departing from the scope of the embodiments of the present invention.

Figure 1B:
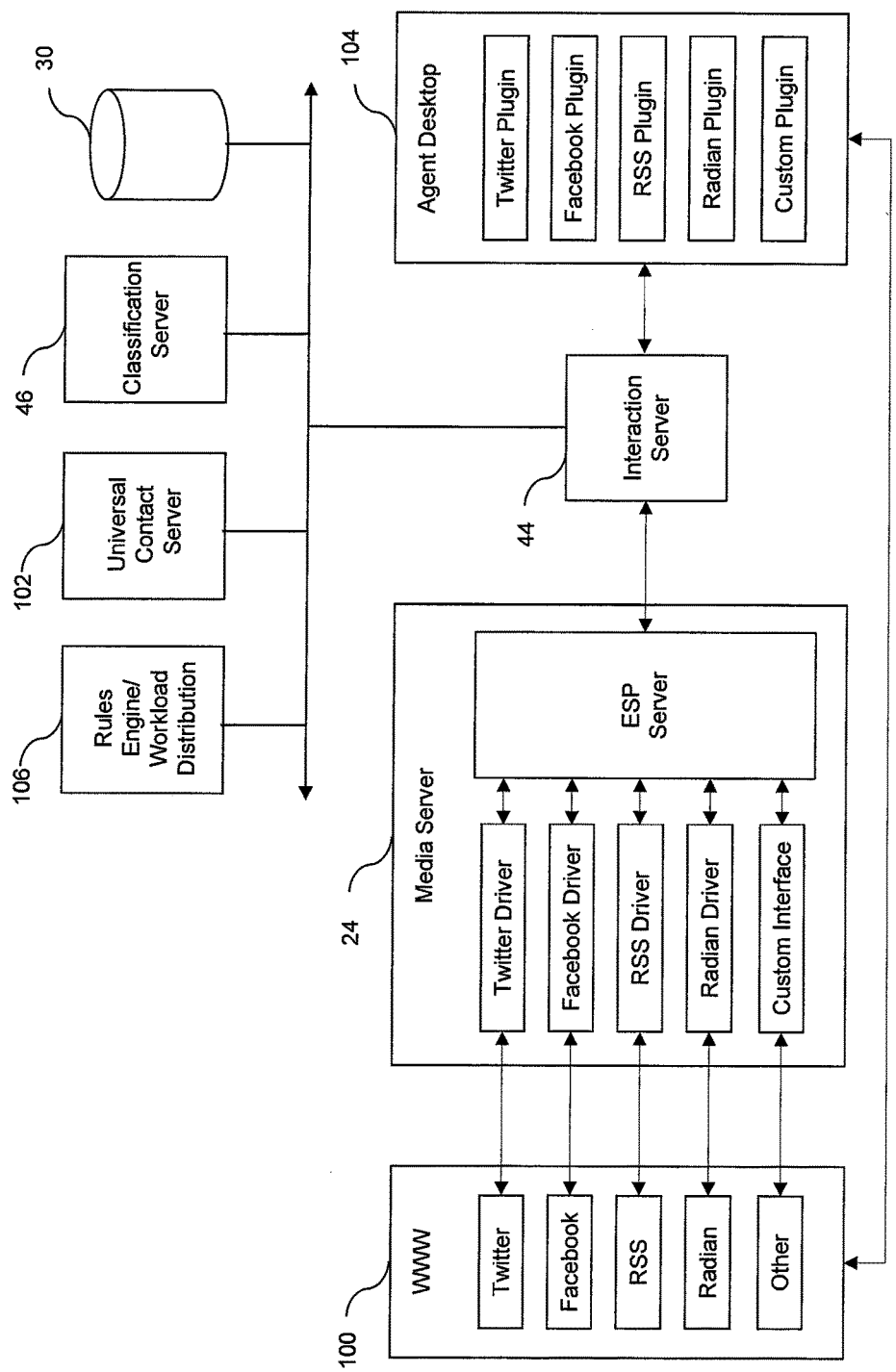
FIG. 1b is a schematic block diagram of a system supporting social engagement in a contact center, according to some exemplary embodiments.

FIG. 1b is a more detailed schematic block diagram of certain components of the system of FIG. 1a for supporting social engagement in a contact center, according to one exemplary embodiment. According to the illustrated embodiment, the media server 24 is configured to interface with social media platforms 100 such as Twitter, Facebook, RSS, and Radian6 over the communications network 14, to bring social media interactions into the contact center system. The media server may also be configured to receive and transmit other non-telephony interactions such as, for example, text, chat, web interactions, and the like. The media server 24 may include pluggable media channel drivers, such as, for example, a Twitter driver and Facebook driver that connect the media server 24 to Twitter and Facebook web servers, respectively. Other channel drivers may include RSS drivers, Radian6 drivers, or any other custom interface for connecting to any type of social site. According to one embodiment, each channel driver submits data from a media source to the business process (or strategy) that is executed by the interaction server 44 and processes the requests that it receives from the strategy. Communication between the channel drivers and the interaction server 44 may be facilitated, for example, by an external service protocol (ESP) server.

Based on the information received from supported social media application programming interfaces (APIs), the media server 24 creates an interaction and delivers the interaction along with any associated data to the interaction server 44. According to one embodiment, all or portions of the interaction are stored in the mass storage device 30 via a universal contact server (UCS) 102. The UCS 102 may be configured to maintain and provide customer contact profiles, including customer contact information (e.g. names, addresses, phone numbers, etc.), contact history (previous interactions with the contact center), and other data used in processing interactions, such as standard responses and screening rules.

According to one embodiment, the interaction server 44 acts as central hub for managing and processing interactions according to one or more business processes. The business processes may employ a classification server 46 to classify the interaction and determine the post's sentiment and actionability as well as the influence and value of the post's author. According to one embodiment, these data points provide a basis for prioritizing the interaction. Other data points in addition to or in lieu of actionability, sentiment, and influence may be considered in prioritizing the interaction. For example, a value rating of the author may also be taken into account. The author's value rating may be retrieved by accessing the company's customer database or customer relationship management (CRM) model. According to one embodiment, CRM is implemented for managing a company's interactions with customers, clients, and sales prospects. It often involves organizing, automating, and synchronizing business processes such as, sales, marketing, customer service, and technical support activities, with the goal of maintaining and expanding the current pool of clients.

When the business process run by the interaction server determines that an agent response should be provided after analyzing and classifying the interaction, the interaction may be either delivered or queued for delivery to an agent. For example, the interaction may be queued in a social message queue for social media interactions.

According to one embodiment, the contact center system includes a rules engine 106 configured to apply one or more business rules based on input data, and provide a result in response. The rules may be invoked, for example, for assigning a priority to an interaction based on data associated with the interaction. The rules may be configured to consider, for example, actionability, sentiment, influence, and the like, and output a priority value as a result of applying the rule. In one aspect, the rules may be invoked for managing social message queues at the contact center in accordance with social media SLAs.

A workload distribution system may also interact with the interaction server 44 for receiving, generating, and/or distributing tasks to the agents. The task may or may not be related to a social media interaction between an agent and a customer. The workload distribution system may be a standalone system or incorporated into one or more components of the contact center, such as, for example, the rules engine 106.

According to one embodiment, the agent devices 38 invoked to engage in social media interactions with customers may each include an agent desktop 104 having a monitor and one or more input devices (e.g. keyboard and mouse). The agent desktop 104 may be configured with various plugins (e.g. a Twitter plugin, a Facebook plugin, a RSS plugin, a Radian6 plugin, or the like) and may provide the agent with graphical user interface (GUI) tools for handling social media tasks. These tools may, for example, provide the agent the ability to send and receive private and public messages, access an author's original post or comment from the agent's browser pane, delete spam or objectionable content, enter disposition codes to assign a business outcome to the agent's actions, and the like. Once a reply is sent by the agent, it may be processed by the business process/strategy employed by the interaction server 44, and delivered back to the media server 24 for delivery to the customer through the social site's API.

Figure 2:
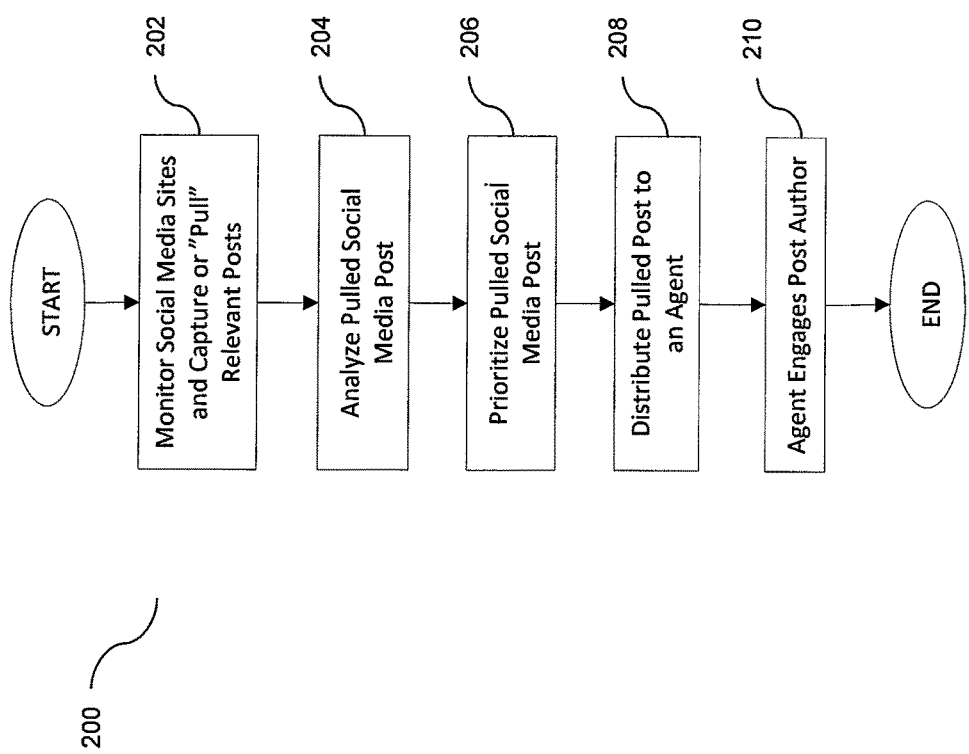
FIG. 2 is a flow diagram of a process for discovering a social media post relevant to the business and engaging the post's author, according to an embodiment of the present invention.

FIG. 2a is a flow diagram of an exemplary process 200 for discovering a social media post relevant to a business and engaging the post's author, according to an embodiment of the present invention. This and other following processes may be described in terms of a software routine executed by one or more processors based on computer program instructions stored in memory. A person of skill in the art will recognize, however, that the process may be executed via hardware, firmware (e.g. via an ASIC), or in combination of software, firmware, and/or hardware. Furthermore, the sequence of steps of the process is not fixed, but may be altered into any desired sequence as recognized by a person of skill in the art.

In step 202, the media server 24 monitors social media sites such as Facebook and Twitter and captures and queues interactions (e.g. posts) that mention the business's name, products, brands, etc. The media server 24 may, for example, wait for messages to be sent to the organization's social accounts (e.g. their Facebook or Twitter account) by the site's API. The media server 24 may also seek out posts that mention the company's name, products, brands, etc., by employing a query mechanism, which may include providing a list of search terms which a deployment partner (e.g. Facebook, Twitter, Google, etc.) crafts into a query. The query may be run on the social site's API at configurable time intervals (e.g. every ten minutes or 30 seconds, etc.) and the messages that are available to the API (private messages often are not) may be returned. According to one embodiment, in addition to the original post, the media server 24 may capture related messages as determined by preset criteria.

The media server 24 may also invoke a notification medium such as Really Simple Syndication (RSS) to receive notification of web feeds relevant to the contact center. An organization may create an RSS "feed" from a news site, blog, forum, etc. The web feed dynamically sends to the media server 24 messages as they appear on various sites. RSS feeds typically include some standard information, such as, for example, the originating site's name, author's information, title, description of and a link to the content.

According to one embodiment, the captured social media interactions are stored in the universal contact server 102 in association with the author (contact) of the interaction. The interaction may then be transmitted to the interaction server 44 for analysis (e.g. of the title and description) for actionability, sentiment, and the like.

According to one embodiment, the media server 24 may also employ third-party social monitoring services such as Radian6 for pulling messages from different social sites and delivering them to the contact center.

In step 204, the interaction server 44 invokes the classification server 46 to analyze the content of the captured social media interaction for particular attributes such as, for example, actionability and sentiment. According to one embodiment, the classification server 46 accesses a natural language processing (NLP) engine for parsing the text of the interaction and classifying/categorizing it to one or more models provided by, for example, the UCS 102, according to any conventional mechanism. The NLP engine may be configured to classify the interaction via pattern-matching, to models of a desired value, which may include, for example, actionable and non-actionable, positive, negative and neutral sentiment, or models for product types or services. These analytical models may be hardcoded by the contact center provider or may be constructed based on the organization's actual messages so that the models match the tone, language, and style associated with the organization's customer communications. In formulating the models, the messages may be distilled by first removing the words that don't add meaning (e.g. "the," "of," "a," "to," etc.) and reducing the remaining words to their root or lexeme.

A social media interaction to be analyzed may follow a similar process before it is compared to the model through pattern matching. The result of the pattern matching process may be, in one example, a number from 1-100 (or a percentage point) that indicates how well the interaction matches the model with high numbers indicating a good match, and low numbers indicating a poor match. The business process or strategy may take the results of the NLP to determine which attribute to assign to the interaction. For example, in the case of actionability, the classification server 46 may test the new interaction against an actionable and non-actionable model. The result with the higher number indicates the best match, so that attribute is assigned. Additionally, multiple attributes (or categories) may be assigned to the interactions through multiple NLP steps to analyze the message. According to an embodiment, a reviewing contact center administrator or agent may, via his or her desktop 104, manually adjust the actionability or sentiment values determined by the classification server 46. The adjustment may be, for example, to correct for any errors that may arise as a result of the NLP's inability to, for example, correctly detect sarcasm or irony.

In step 206, the interaction server 44 invokes the rules engine 106 to prioritize the captured interactions based on interaction attributes such as, for example, the actionability of the message, the sentiment of the message, the business value of the author, and the social (or network) influence of the author, or any subset thereof. For example, the interaction server 44 may be configured to pass to the rules engine 106 one or more of the interaction attributes and receive, in return, a priority value for the interaction.

With respect to actionability, the classification server 46 may, upon analysis of an interaction, determine a degree of actionability of the interaction. For example, actionable messages may request assistance, pose a question, and the like. Other messages may be simple comments, which may not warrant any specific action, in which case the classification server may be configured to assign a low or non-actionability value to the interaction. Messages that are considered non-actionable may be routed as low priority, or simply ignored, based on a low priority value assigned to the message upon invocation of the rules.

With respect to sentiment, the interaction server 44 may, for example, receive from the rules engine a higher priority value for interactions that carry a negative sentiment/tone than those that have a positive or neutral tone, recognizing that people are generally likely to remember and pass on bad news rather than good news. In one aspect, a message with a neutral tone from a previously very positive customer may be given higher priority. In certain instances, an interaction with a positive sentiment may be deemed to be actionable and hence, given a higher priority for engaging the customer, to encourage him or her to take additional actions to promote the company. For example, if a previously negative customer is now satisfied and posts a comment with a positive sentiment, the rules engine may be configured to engage the customer to, for example, become a member of an advisory board, post a "like" for the business on Facebook, and/or the like.

According to one embodiment, the rules consider a value (to the enterprise's business) of an author of an interaction, as a factor in prioritizing the message. The author's value may be determined based on, for example, the author's general status as a "Gold," "Silver," or "Bronze" client. The author's value may also be determined based on impending business opportunities with the author, such as, for example, a pending insurance policy renewal, in the case of an insurance company, or a pending loan application, in the case of a bank.

According to an embodiment of the present invention, the influence of the author of an interaction is further considered in assigning a priority value to the interaction. Influence may refer to the reach of one's online social network, and may be determined based on the size of the person's online social network. The size of the person's online social network may be based on the number of people that are directly or indirectly connected to the person over the online social media network. Influence of a particular person may be calculated, for example, based on the number of followers that the person has on Twitter, the number of followers that the person's followers have, the number of friends the person has on Facebook, the number of friends that the person's friends have, the number of messages the person posts on average, the number of posts that are forwarded, resent, or shared to others in the person's social network, and/or the like. According to one example, the rules may be configured to consider an author's influence level in assigning a priority to an interaction if the influence level is above a certain threshold. An author's influence may be obtained, for example, from a third-party influence engine such as Klout.

According to one embodiment, prioritizing an interaction based on actionability, sentiment, influence, and value, as well as other variables, may be dependent on the business process or strategy reflected by the business rules applied by the rules engine. For example, one rule may be that if an interaction is actionable, sentiment is negative, and influence is high, a high priority is assigned to the interaction. Another rule may be that if the author of an interaction is highly influential and sentiment is negative, a high priority is assigned to the interaction even if the interaction is not classified as being actionable. Conversely, a negative message posted by an author who has a very low social influence value may be ignored and not routed to any agent if the interaction is not classified as being actionable.

According to an embodiment of the present invention, a contact center supervisor or administrator may manually adjust the priority given to a particular interaction, or adjust one or more of its attributes (e.g. actionability, sentiment, and/or the value and influence of its author), via a graphical user interface provided by the supervisor or administrator's desktop 104. According to one aspect, an agent may also have the ability to adjust one or more of the interaction attributes upon reviewing the interaction. In one embodiment, the adjustments made by the agent and/or administrator may be used as a feedback mechanism for improving the pattern matching algorithm and classification process employed by the classification server 46.

In step 208, the routing server 20 is invoked by the interaction server 44 for distributing the prioritized interaction to an available agent according to a routing strategy. The routing strategy may consider, for example, business rules, service level agreements (or more specifically, social media SLAs), agent skills and preferences, the desired agent skills for handling the given social post, and/or the like. According to one embodiment, one or more attributes of the prioritized interaction are transmitted to the routing server 20 along with a routing request. The routing strategy that is employed may be configured to consider the one or more attributes in making a routing decision. For example, the routing strategy may assign interactions that have a negative sentiment to one or more of a special group of agents that may have training and/or experience in handling disgruntled customers.

According to one embodiment of the present invention, the influence of a customer contacting a contact center is an attribute that is taken into account by the routing strategy in making a routing decision. For example, the routing strategy may be such that interactions by customers with a high influence are routed to specific groups of agents. For example, if the customer is assigned an overall influence score that is above 90% as calculated via any known influence calculating algorithm, an interaction by the customer may be routed to the agents with the highest skill level. As with priorities, supervisors or administrators may manually adjust message distribution via the graphical user interface on the administrator's desktop 104.

In step 210, an assigned agent receives the interaction operational data (e.g. text of the social media post) on his/her desktop 104 and engages the author of the interaction. In this regard, a task generated for the interaction may be pushed to the agent's desktop 104 for acceptance or refusal. The task may also be queued in the agent's workbin 26 for retrieval when the agent is ready to handle the task. According to one embodiment, the agent interacts with the customer (at least initially) on the same media channel from which the interaction was captured. For example, a Twitter post by the customer may be responded with another Twitter post, a Facebook post may be responded with a Facebook comment, or the like.

In one embodiment, the routing strategy may bypass distributing the interaction to an agent and instead distribute the interaction to an automated response system for retrieving a ready-made response from a standard response library, based on analysis of the content of the interaction.

Examples 1-4 below demonstrate the flow of process 200 in four separate use cases.

Example 1 demonstrates a scenario in which a Twitter message is sent to a business through a mention (by posting a message in the format: "@"+[Twitter account handle]+user message) and both the business process and the assigned contact center agent send a reply. In this example, it is assumed that the company, Genesys, has a Twitter account under the same name that is being monitored by its contact center. The customer uses his/her Twitter account to post a message: "@Genesys Hello I have a problem." The new message is posted into Twitter's special "mentions" folder: "@Genesys". A contact center's social engagement strategy may entail the following:

1. The media server 24 captures this message.

2. The interaction server 44 creates an interaction and places it into the appropriate queue and business process/strategy. The interaction may be associated with a number of parameters, which may include, for example, the author's name/username, @mentions and/or relevant key words contained in the message, and the like.

3. Customer profile details are received with the message through the Twitter API. The profile details may be attached to the interaction. All useful Twitter profile information can also be saved in one of the contact center's databases operated by, for example, the contact center's UCS 102 or context services (CS).

4. The incoming Twitter interaction is processed according to the contact center rules. Once in the strategy, the interaction may be analyzed as needed. The classification server 46 can determine if the customer is a follower. It can further calculate the customer's business value and influence and the message's sentiment and actionability. In this example, the classification server 46 determines that the actionability rating is high, but the author of the post is not a follower of Genesys's Twitter account.

5. The organization has defined its business rules such that non-followers are sent a follow request. This allows the agent to assist customers over Twitter privately.

6. The business process/strategy creates a follow request tweet such as "Please follow @Genesys for us to assist you."

7. The tweet is stored in the UCS/CS as an outgoing Twitter message and associates it with the same interaction.

8. The contact center sends the Twitter message to the customer.

9. The customer sees the tweet and responds by following the @Genesys Twitter account.

10. The original incoming Twitter interaction is delivered to an agent's desktop 104. The desktop 104 identifies that this message was directed to the business and the author is a follower of the business's Twitter account.

11. The agent reads the incoming Twitter message and sends a private response. Alternatively, the agent may mark this interaction as "Done," assign a disposition code and not take any further action. In this case the agent sends a direct message (private message) as a reply.

12. The interaction server 44 creates an interaction in UCS/CS for the outgoing Twitter interaction and associates it with the same customer contact.

13. The media server 24 submits a reply to the customer.

Example 2 demonstrates a scenario in which a public message that mentions a company's product name is posted on Twitter and the company's contact center agent responds via a private message. In this example, it is assumed that the company has configured queries to search the social sites. These queries may contain certain key words that identify the message as relevant to the organization. A contact center's social engagement strategy may entail the following:

1. The media server 24 runs a query and captures this message.

2. The interaction server 44 creates an interaction and places it into the appropriate queue and business process/strategy. The interaction may be associated with a number of parameters, which may include, for example, the author's name/username, @mentions and/or relevant query key words contained in the message, and the like. The strategy creates the interaction in the UCS/CS and associates it with the contact.

3. Customer profile details are requested by the strategy. The profile details are attached to the interaction. This profile info may be requested specifically for messages not sent to the business either directly or through a mention.

4. All useful profile Twitter information may also be saved in UCS/CS.

5. The incoming Twitter interaction is processed according to the contact center rules. Once in the strategy, the message can be analyzed as needed. The classification server 46 can determine if the contact is a follower. It can further calculate the customer's value and influence and the message's sentiment and actionability.

6. The interaction is delivered to an assigned agent's desktop 104. The desktop 104 identifies that this message was not directed to the business and whether or not the author is a follower of the business's Twitter account (following is required for direct (private) messages). In this example, the post's author is a follower.

7. The agent processes the incoming Twitter message and sends a response if required. Alternatively, the agent may mark this interaction as "Done," assign a disposition code and not take any further action. In this case the agent sends a direct message (private message) as a reply.

8. The interaction server 44 creates an interaction in UCS 102 for outgoing Twitter interaction and associates it with the same contact.

9. The strategy submits a reply to the author.

10. The media server 24 sends a reply back to the customer. Depending on the agent's setting, the media server 24 sends either a regular message, which appears on the customer's timeline, or, as in this case, a direct message which is delivered to the customer's inbox.

Example 3 demonstrates a scenario in which a Facebook message is posted to a business's Facebook page wall and the contact center agent replies with a public message. In this example, it is assumed that a business has a Facebook account and a number of Facebook pages that it monitors. These pages have walls where customers and page administrators can place posts and comments. In order to make posts and comments customers need to "like" the particular pages where they want to post. In this example, a customer posts a message on the company's wall and several other Facebook users later add their comments to this post. A contact center's social engagement strategy may entail the following:

1. The media server 24 queries this page's wall and finds the new post with comments. The query is run on a configurable timer.

2. The interaction server 44 creates an interaction and places it into the appropriate queue and business process/strategy. The interaction includes the original post plus comments which are posted within the query's timeframe. Additional attributes describing the author's and commentators' profiles may also be part of the interaction structure. The strategy creates the interaction in UCS/CS and associates it with the contact(s).

3. Additional request to get more profile info can be sent from strategy.

It should be noted that while the interaction representing the initial post and comments is in queue, further comments could be added to the message thread. The query may pick up these additional comments and create another interaction. It is desirable for these two interactions to be routed to the same contact center agent. As such, either the messages are delivered to the agent together or the agent may need to be notified of the additional pending interactions.

4. The incoming Facebook interaction is processed according to the contact center rules and delivered to an agent.

5. The agent processes the incoming Facebook message and sends the response if required. Alternatively, the agent may mark this interaction as "Done", assign a disposition code, and not take any further action.

6. The outgoing Facebook interaction is placed into the appropriate queue/strategy.

7. The interaction server 44 creates the interaction in UCS/CS for the outgoing Facebook interaction and associates it with the same contact. This data is accessible/visible in the contact's history with UCS 102.

8. The strategy submits a reply to the customer.

9. The media server 24 sends reply back to the customer.

Example 4 demonstrates a scenario in which an RSS feed notifies the company of a blog, news site, or the like, that mentions its product by name and both the business process and the assigned contact center agent send a reply. In this example, it is assumed that a business has created a blog keyword search using an online search engine such as Google. The search looks for variations of a product name across blog sites searched by Google. After creating the search and tuning it by subtracting terms to filter the results to just the content that is of interest, an RSS feed is created. The feed uniform resource locator (URL) is added to the media server 24. A contact center's social engagement strategy may entail the following:

1. The search is executed and any new results are captured by the media server 24.

2. The interaction server 44 creates an interaction and places it into the appropriate queue and business process/strategy. The interaction includes the RSS message as well as additional parameters that may include the author, title, description and URL of the message as commonly received along with the RSS message. All RSS information can also be saved in the UCS/CS.

4. Incoming RSS interaction is processed according to the contact center rules. Once in the strategy, the interaction can be analyzed as needed. The classification server 46 can determine if the contact exists in the contact center's customer database. It can further calculate the customer's value and influence and the message's sentiment and actionability. In this example, the classification server 46 determines that the actionability rating is high but the author of the post is not a known customer.

4. The organization has defined its business rules such that all blogs mentioning the product are sent to agents for review.

5. The incoming RSS interaction is delivered to an assigned agent's desktop 104. The desktop 104 identifies that this message was directed to the business and that the author is not a known customer.

6. The agent reads the incoming RSS message containing the title of the blog entry, the description and the author name and decides that the blog is worth reviewing. Alternatively, he/she may find a review is not necessary and mark this interaction as "Done," assign a disposition code, and not take any further action.

7. To review the blog entry the agent clicks on the URL in the message which opens his/her browser to the blog.

8. The agent reviews the blog and may choose to comment or simply to enter the disposition "No comment necessary" and mark the interaction as "Done." In this case a comment is warranted.

9. The agent enters a comment on the blog directly and copies the text entered to paste into the "notes" field for later reference.

10. The agent then selects the disposition code "Comment entered" and marks the interactions as "Done."

FIGS. 3a-3f are screen shots of the interaction workspace graphical user interface (GUI) accessible by a contact center agent for engaging an author on Twitter.

Figure 3A:
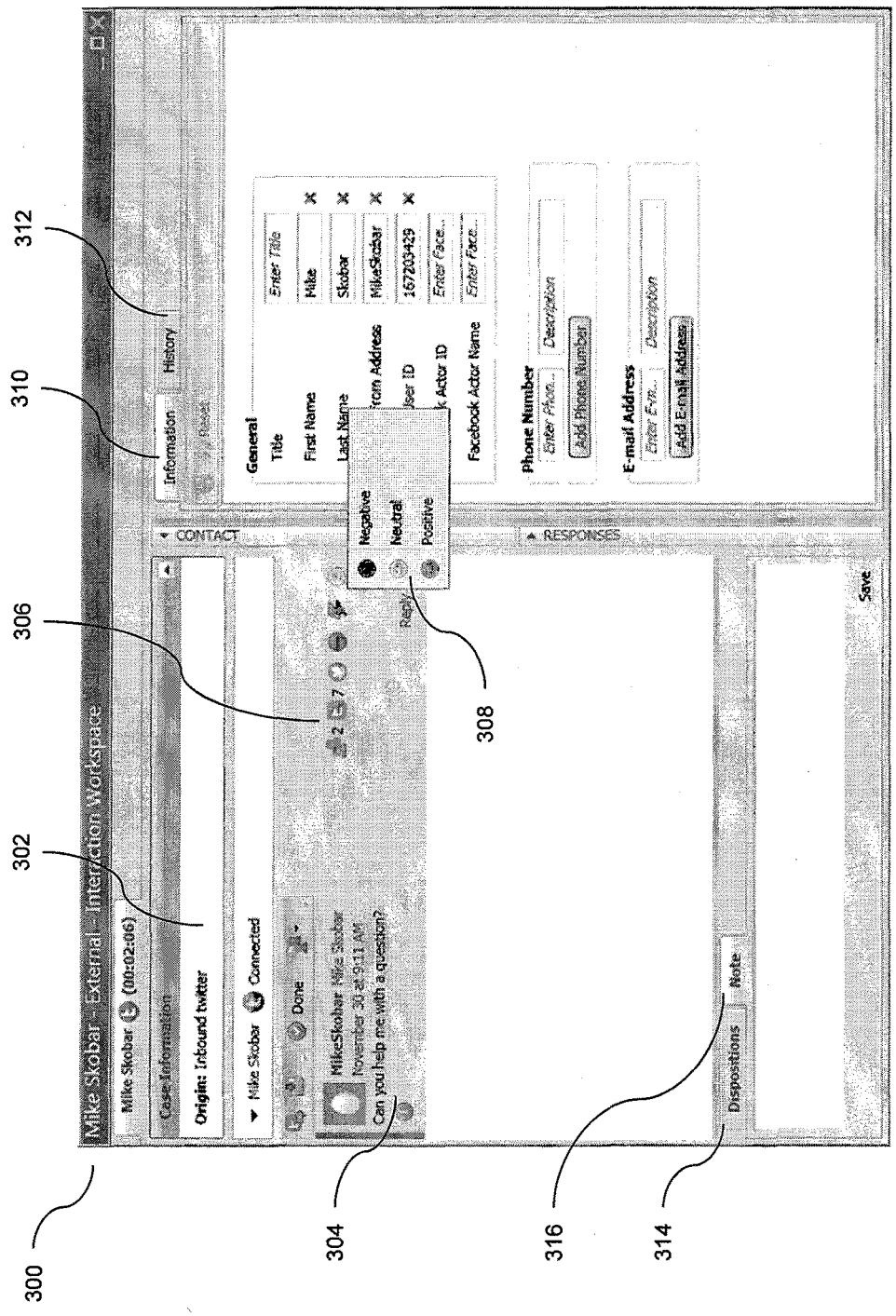
FIG. 3a is a screen shot of a graphical user interface (GUI) rendered upon delivery of a social post to an agent's desktop, according to an embodiment of the present invention.

FIG. 3a is a screen shot of a GUI 300 rendered upon delivery of a social post to an agent's desktop 104, according to an embodiment of the present invention. According to this example, when an inbound Twitter post 302 is delivered to an agent's desktop 104, the agent may see, for example, the original post 304, the location where the post was found (e.g. "Public Tweet" or "Company Facebook Wall"), and the actionability, sentiment, influence, and value score, as depicted by icons 306. These icons 306 may additionally indicate the number of Twitter followers or Facebook friends the author has, the number of tweets or public Facebook messages the author has posted, whether the individual is a follower of the business, whether the business is the follower of the author, and/or the like.

In some aspects, upon review of a post, an agent may adjust the actionability or sentiment of the message as interpreted by the classification server 46 using, for example, a drop down window 308. Such a feature may be desirable since natural language processors may have difficulty correctly interpreting sarcasm, satire, or irony. The agent may also be able to follow or unfollow a Twitter user as may be appropriate.

According to one aspect, the agent's desktop 104 may provide access to a customer's profile 310, which may include, for example, the author's first and last name, address, contact information (such as phone number, email, Twitter/Facebook usernames, etc.) as well as other customizable fields.

In one embodiment, the agent's desktop 104 may provide a view of the customer's cross-channel interaction history 312, which may provide context for the author's post and enable the agent to better respond to the message. Each social media post and response may be listed, as well as a transcript of other communications with the author, and any associated data and notes taken by the agent in reference to handling the customer's request. For example, a consumer who is unhappy with the results of a call made to the contact center may decide to vent his/her frustration on Twitter or Facebook. When that post is captured and distributed to an agent for engagement, the agent may see the details of the call in a "Contact History" section of the graphical user interface, which may allow the agent to understand what precipitated the angry tweets, allowing them to intelligently reply to the consumer.

According to an embodiment of the present invention, the agent may set disposition codes 314 that designate a business outcome for each of the social posts assigned to the agent. For example, some messages may not warrant a response, in which case, the user can set a disposition code of "No response needed" and proceed to the next message. Additionally, an agent may add any relevant notes 316 to the interaction record for later reference.

According to an embodiment, for messages that do warrant a response, the agent may be able to reply directly from his/her desktop 104. These replies may be public (anyone can see them) or private (only the sender and recipient can see them). In one example, the agent may be able to select a "pre-canned" response from the standard response library and edit it as may be necessary before submitting it to the customer. The interaction workspace may also be configured to display a suggested response to the agent based on analysis of the message content, according to an embodiment of the invention. In such a case, the agent may be able to edit the suggested response before replying to the customer.

Figure 3B:
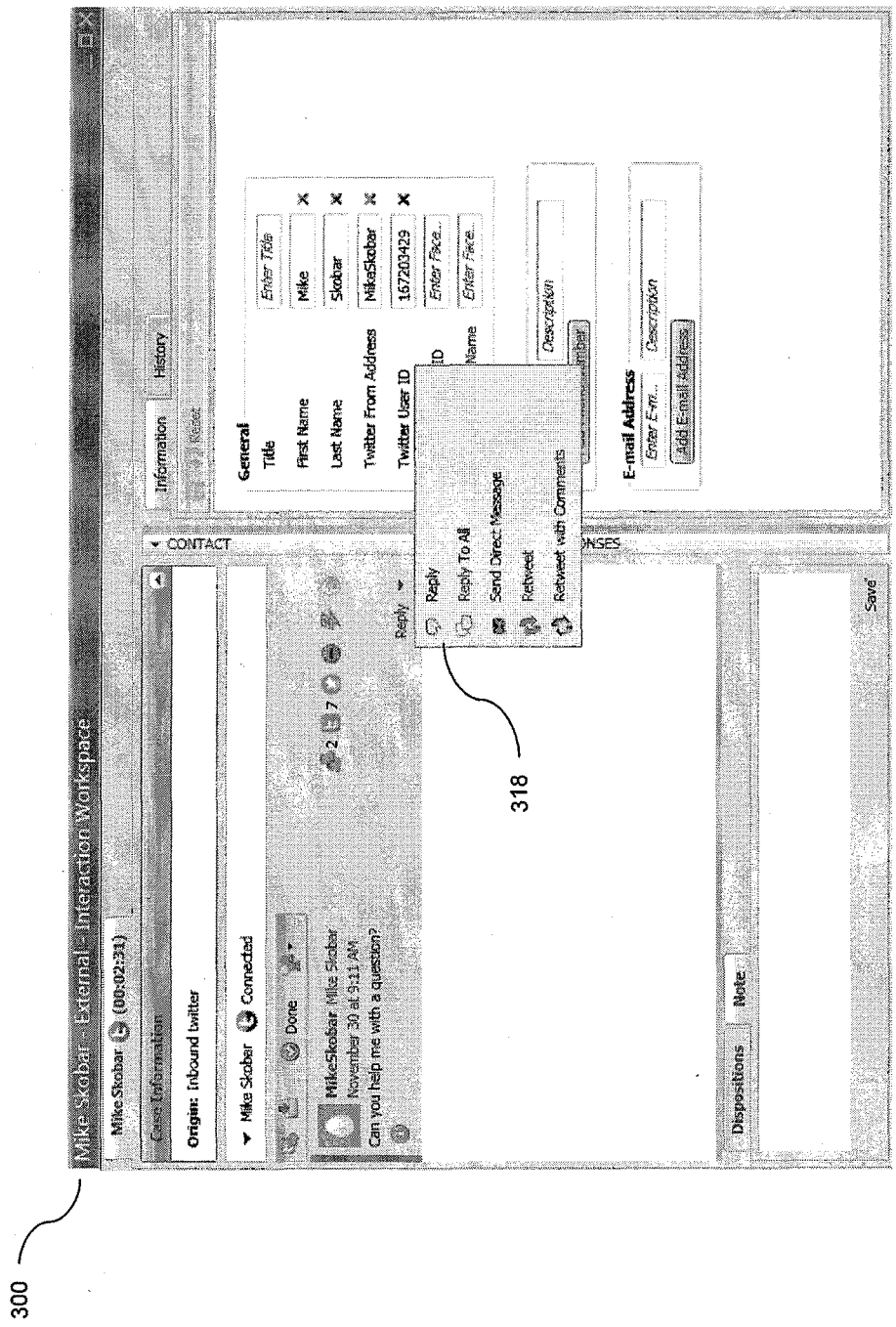
FIG. 3b is a screen shot of a GUI rendered upon delivery of a social post to an agent's desktop, further depicting a feature of the interaction workspace that enables an agent to respond to a tweeted post, according to an embodiment of the present invention.

FIG. 3b is a screen shot of a GUI 300 rendered upon delivery of a social post to an agent's desktop 104, further depicting a feature of the interaction workspace that enables an agent to respond to a tweeted post, according to an embodiment of the present invention. In this example, a dropdown window 318 enables an agent to respond to a tweet by replying to the tweet, sending a direct message to an author who is a follower of the organization, retweeting the message, or retweeting with additional comments.

Figure 3C:
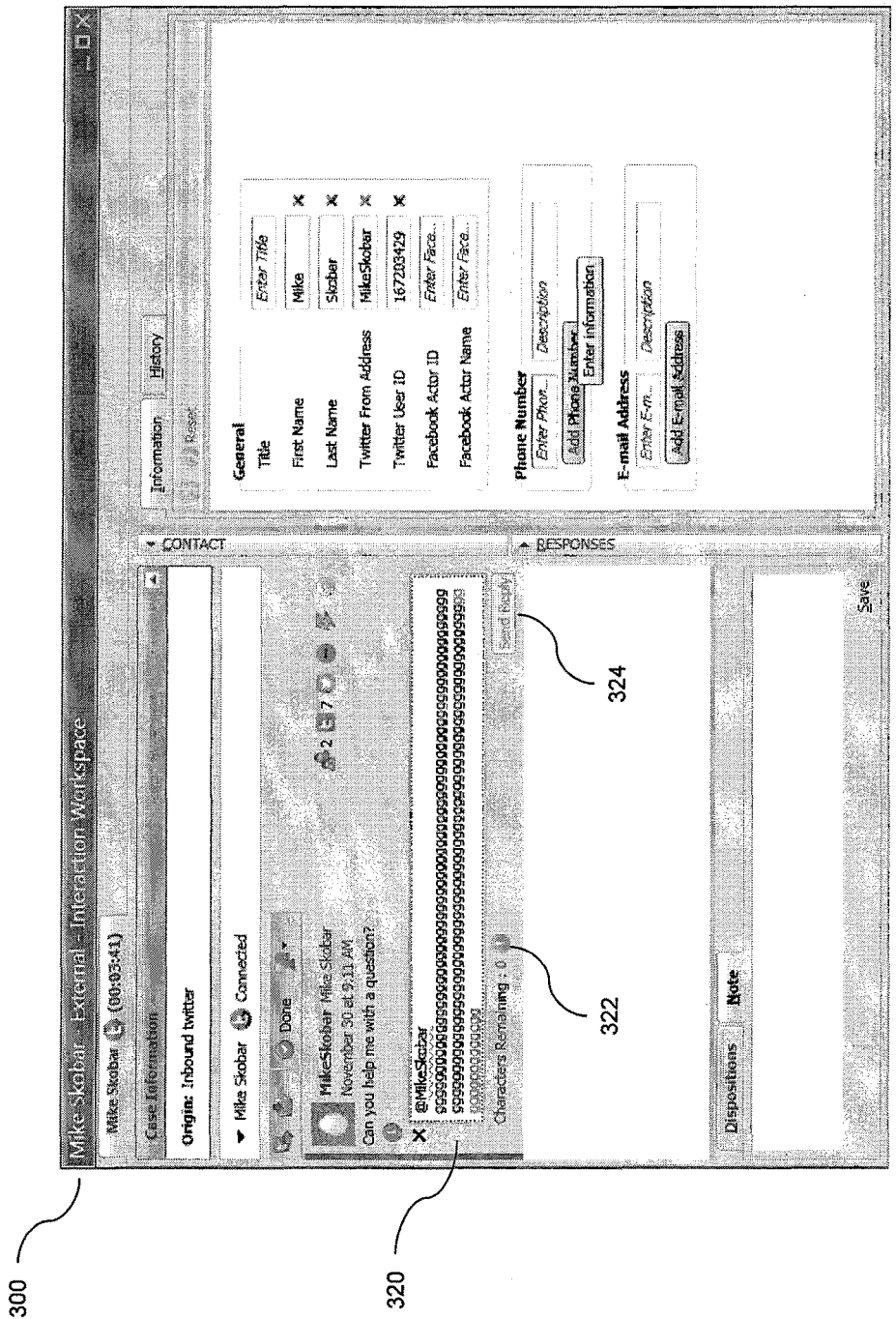
FIG. 3c is a screen shot of a GUI rendered upon delivery of a social post to an agent's desktop, further depicting a feature of the interaction workspace that enables an agent to respond to a tweeted post from within the interaction workspace, according to an embodiment of the present invention.

FIG. 3c is a screen shot of a GUI 300 rendered upon delivery of a social post to an agent's desktop 104, further depicting a feature of the interaction workspace that enables an agent to respond to a tweeted post from within the interaction workspace, according to an embodiment of the present invention. In this example, the GUI has a field 320 that allows an agent to respond to the author's post by mentioning the author (e.g. "@MikeSkobar") in a reply post. According to one aspect, the author's name may be populated in the reply field automatically when an agent decides to reply to the author. In one example, the GUI may track and display the character count of the response. When the count exceeds a limit (e.g. 140 characters for Twitter), any characters in excess may be highlighted and the alert icon 322 may be displayed and the reply button 324 may be disabled.

Figure 3D:
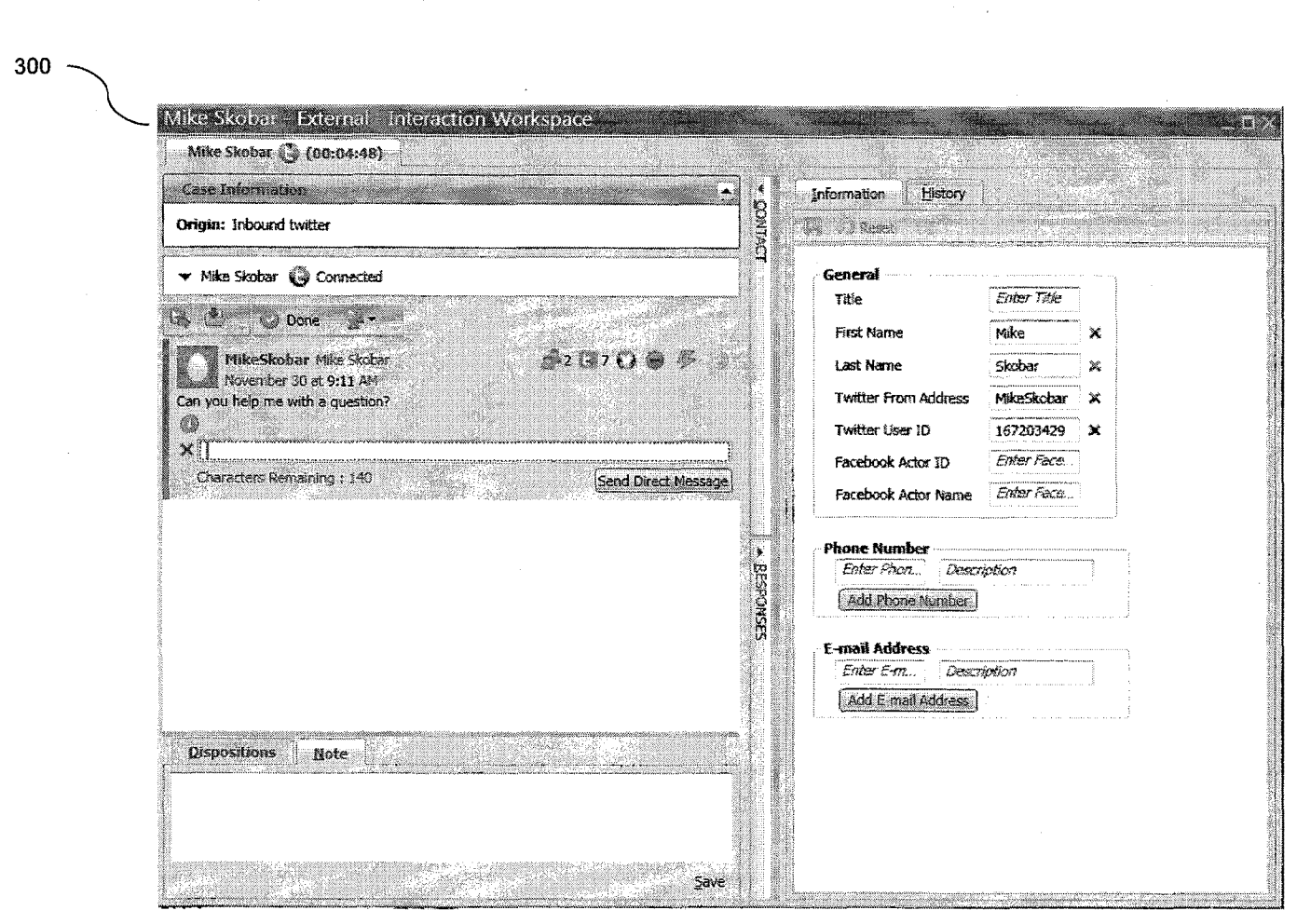

FIG. 3d is a screen shot of a GUI 300 rendered upon delivery of a social post to an agent's desktop 104, further depicting a feature of the interaction workspace that enables an agent to send a direct response to a tweeted post from within the interaction workspace, according to an embodiment of the present invention.

Figure 3E:
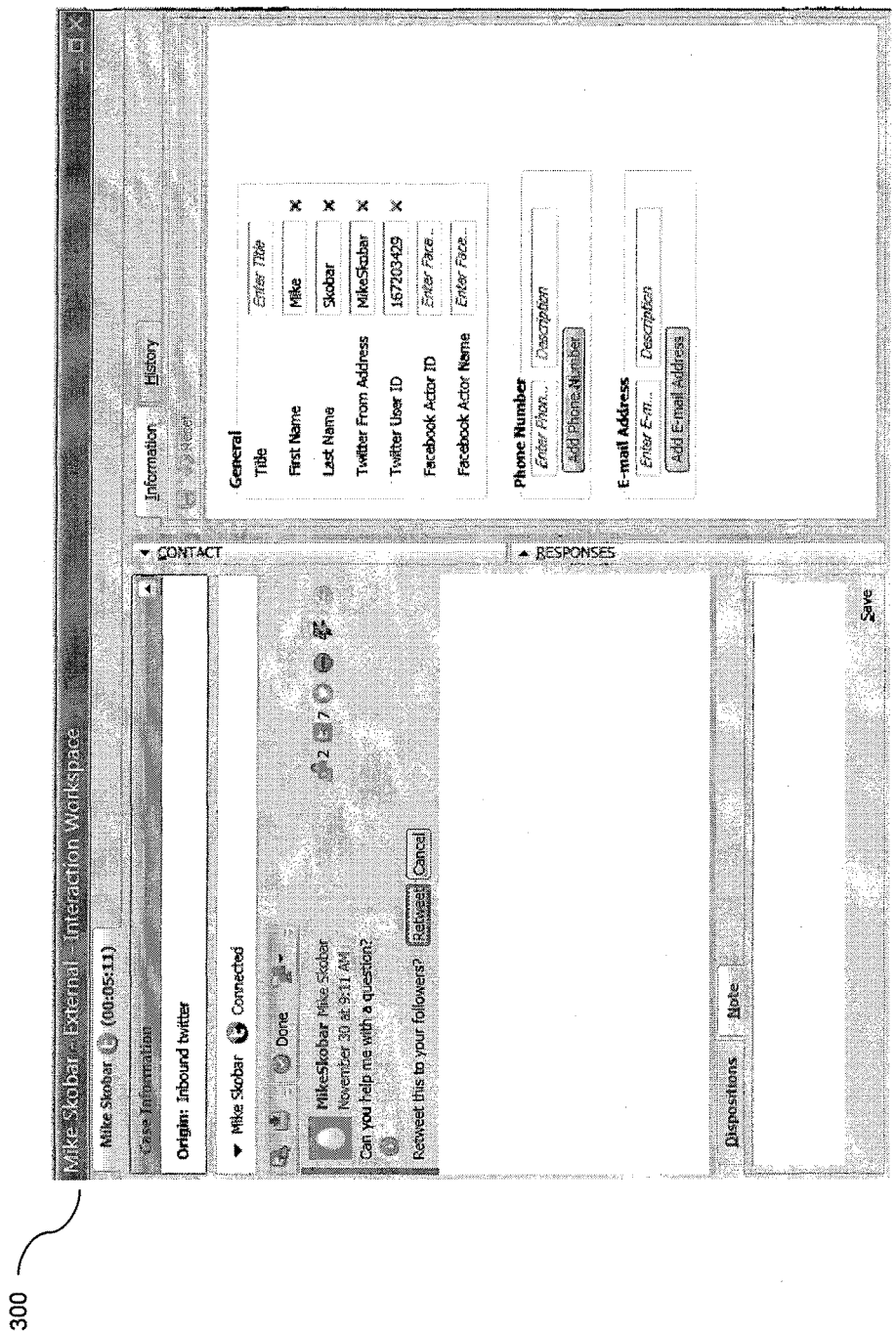
FIG. 3e is a screen shot of a GUI rendered upon delivery of a social post to an agent's desktop, further depicting a feature of the interaction workspace that enables an agent to retweet a Twitter post to the organization's followers from within the interaction workspace, according to an embodiment of the present invention.

FIG. 3e is a screen shot of a GUI 300 rendered upon delivery of a social post to an agent's desktop 104, further depicting a feature of the interaction workspace that enables an agent to retweet a Twitter post to the organization's followers from within the interaction workspace, according to an embodiment of the present invention. A standard retweet may not allow the message to be edited.

Figure 3F:
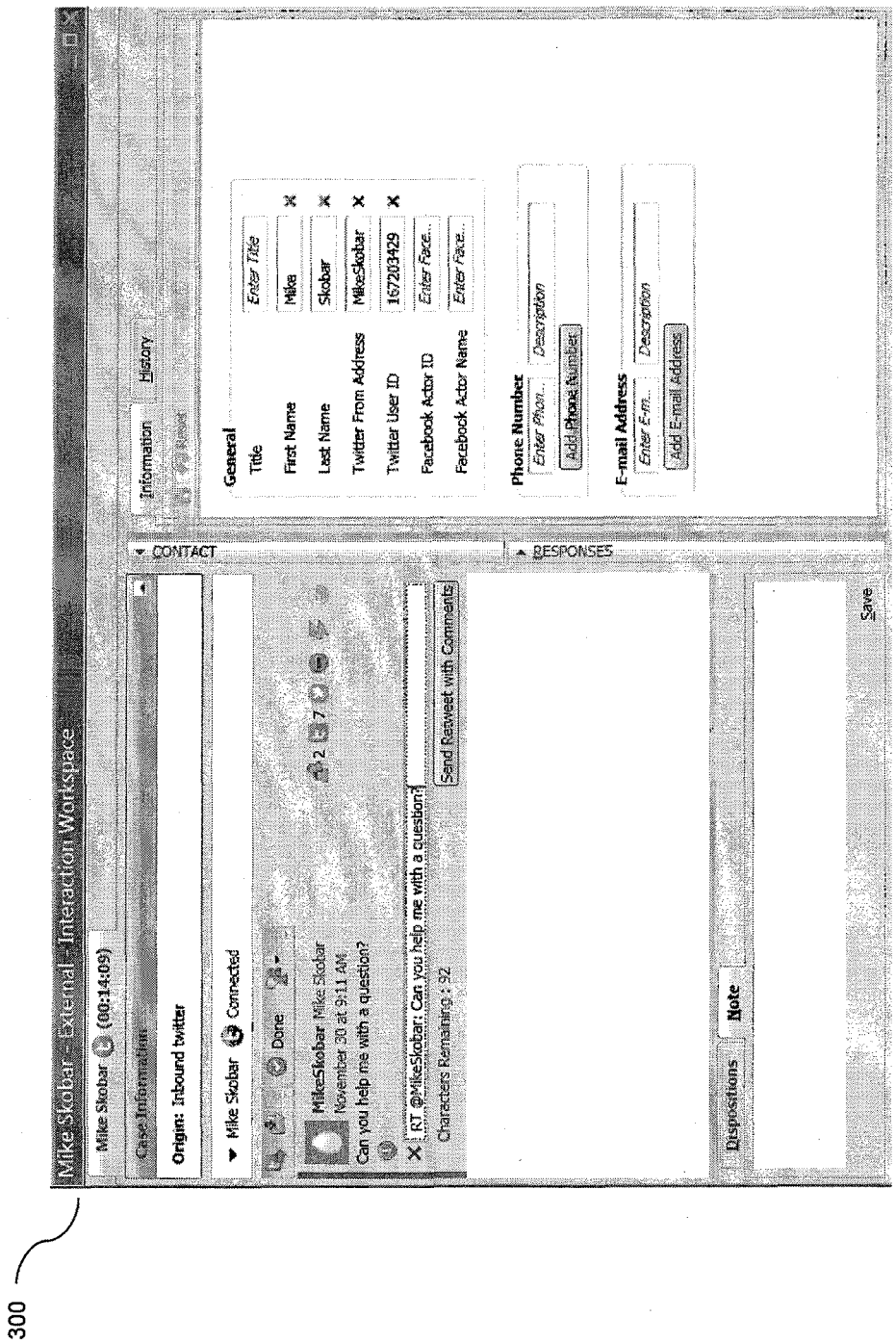
FIG. 3f is a screen shot of a GUI rendered upon delivery of a social post to an agent's desktop, further depicting a feature of the interaction workspace that enables an agent to retweet with comments a Twitter post to the organization's followers from within the interaction workspace, according to an embodiment of the present invention.

FIG. 3f is a screen shot of a GUI 300 rendered upon delivery of a social post to an agent's desktop 104, further depicting a feature of the interaction workspace that enables an agent to retweet with comments a Twitter post to the organization's followers from within the interaction workspace, according to an embodiment of the present invention. In this example, the agent may edit the text of the retweet text as needed.

FIGS. 4a-4e are screen shots of the interaction workspace GUI accessible by a contact center agent for engaging an author on Facebook.

Figure 4A:
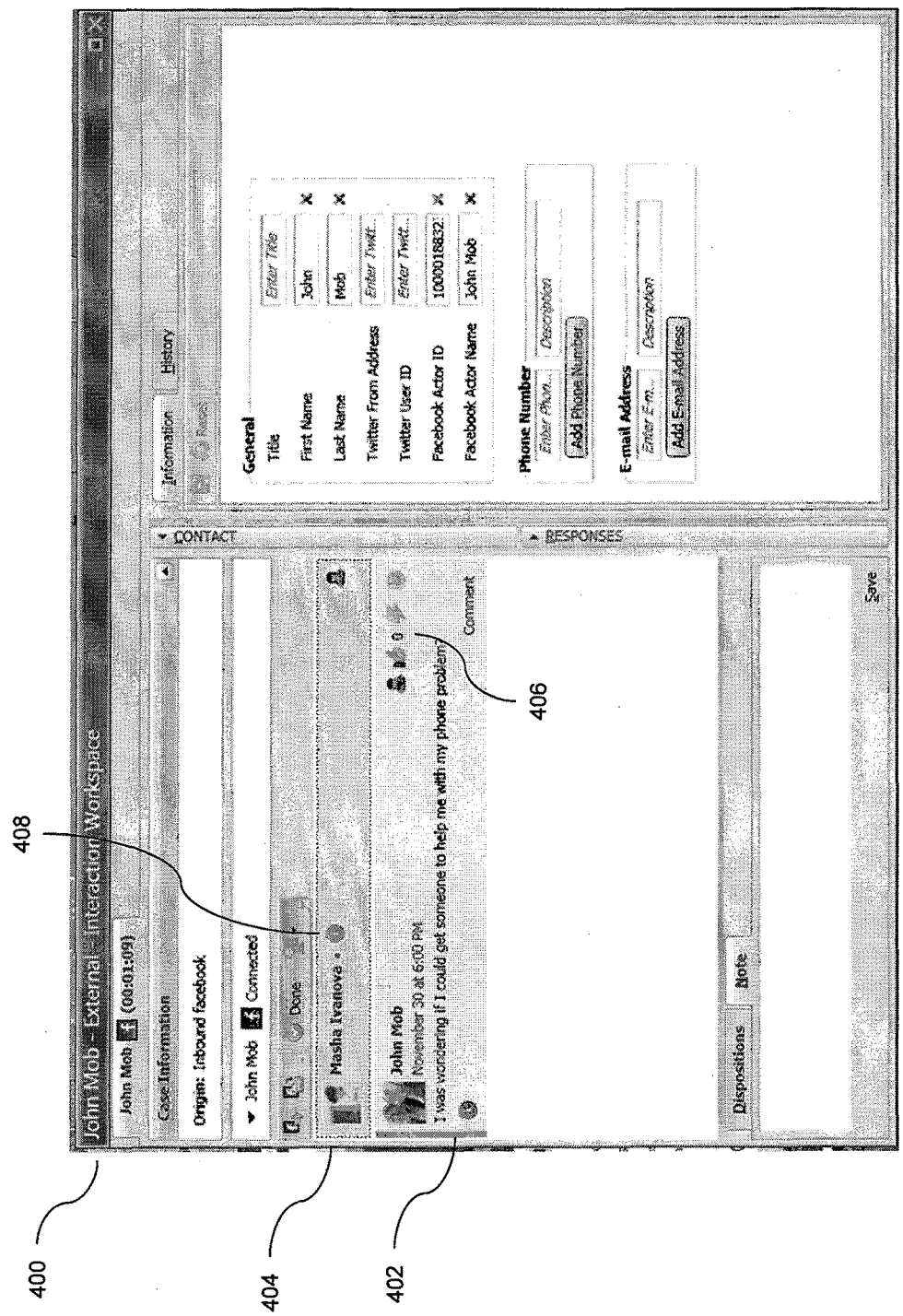
FIG. 4a is a screen shot of a GUI rendered upon delivery of a Facebook post to an agent's desktop, according to an embodiment of the present invention.

FIG. 4a is a screen shot of a GUI 400 rendered upon delivery of a Facebook post to an agent's desktop 104, according to an embodiment of the present invention. In this example, when an inbound Facebook post is delivered to an agent's desktop 104, the agent may see the original post, which is a Facebook post by John Mob 402 on Macha Ivanova's wall 404. Icons 406 may show, for example, the gender of the author, the number of likes the message has received (zero in this case), and the actionability and sentiment of the message as determined by the classification router 46. An information button 408 may show additional data on the author and post.

Figure 4B:
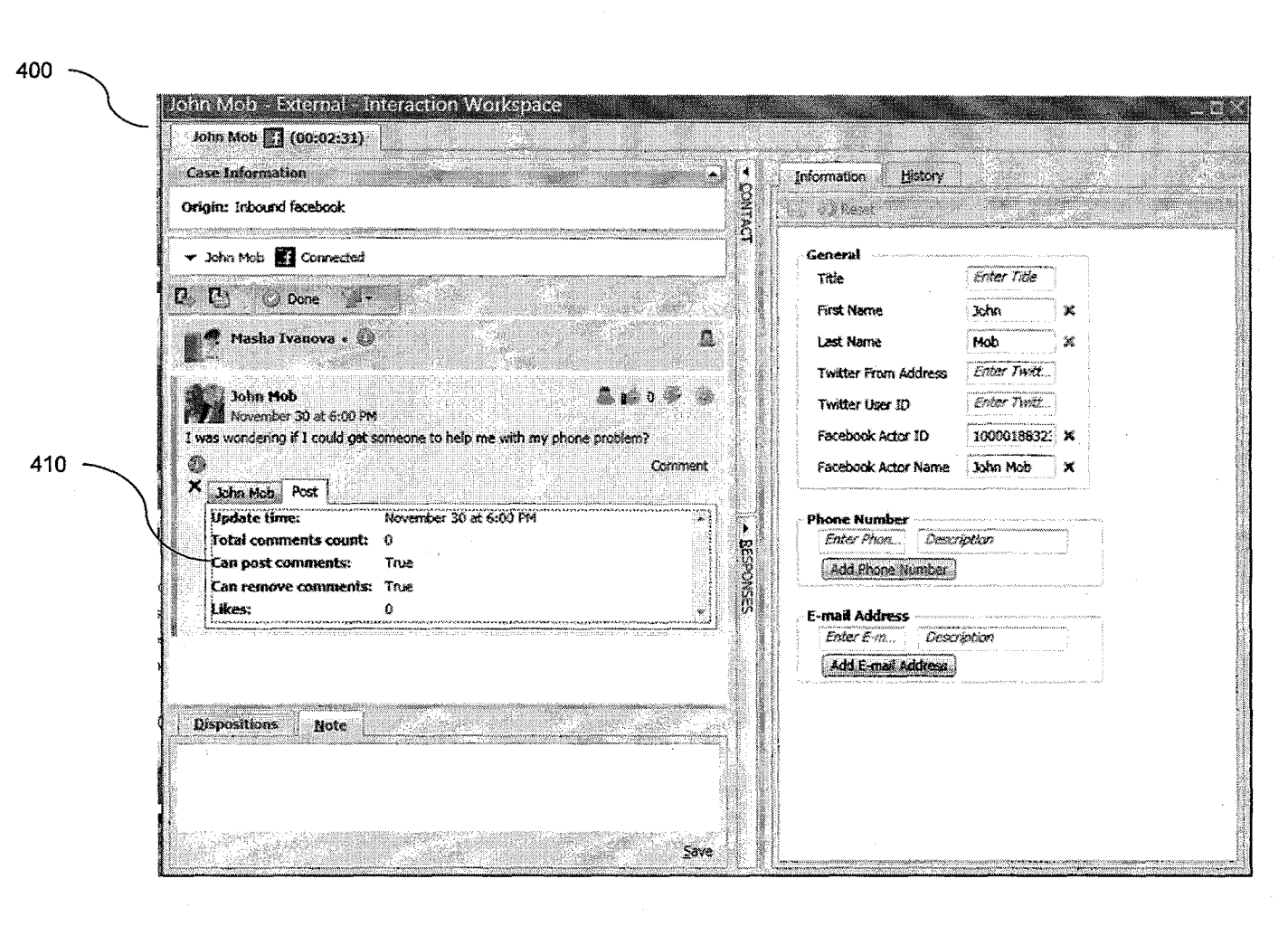

FIG. 4b is a screen shot of a GUI 400 rendered upon delivery of a Facebook post to an agent's desktop 104, further depicting the additional data on the original author and post 410, according to an embodiment of the present invention.

Figure 4C:
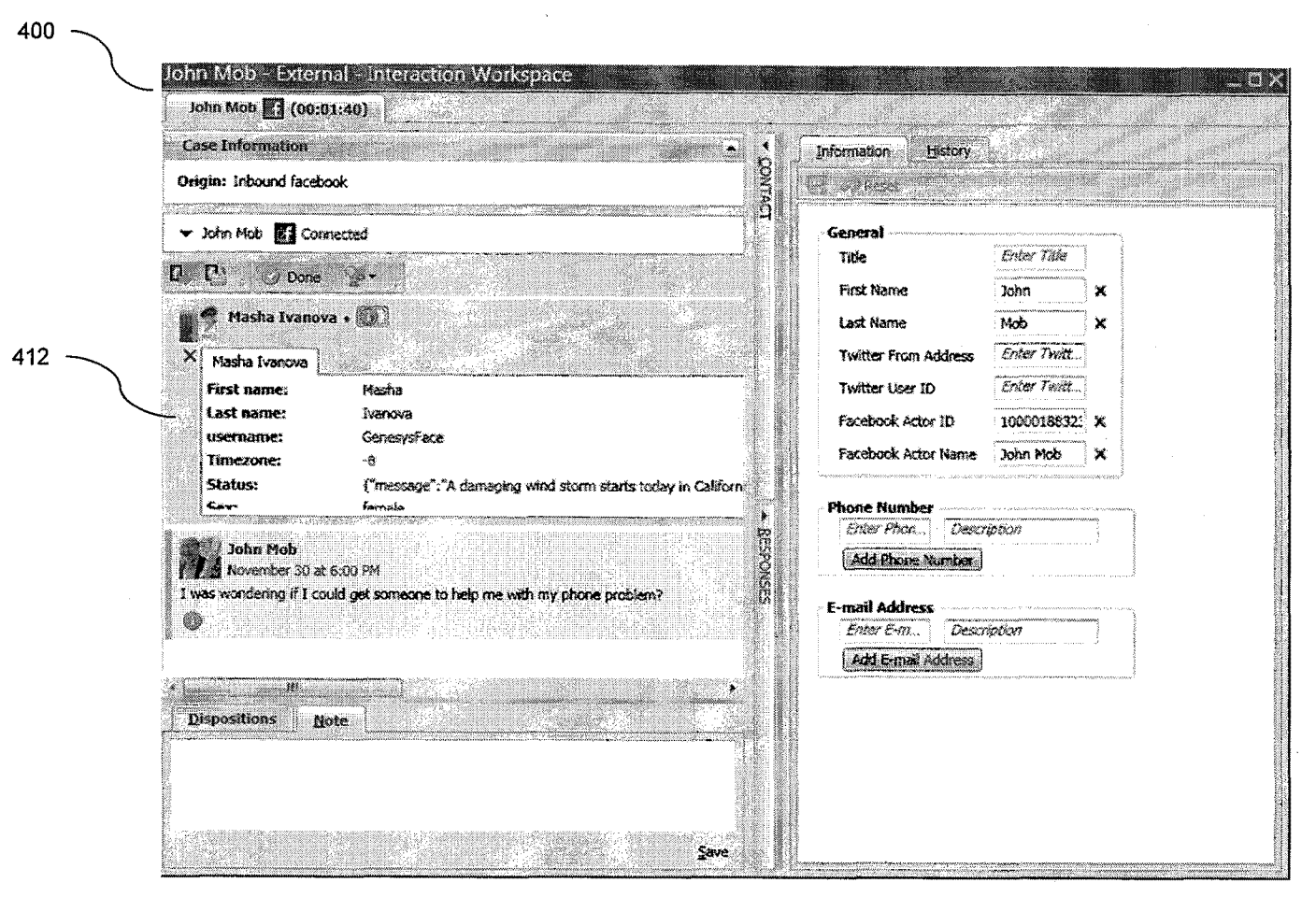

FIG. 4c is a screen shot of a GUI 400 rendered upon delivery of a Facebook post to an agent's desktop 104, further depicting the additional data on the wall 412 where the message was posted, according to an embodiment of the present invention.

Figure 4D:
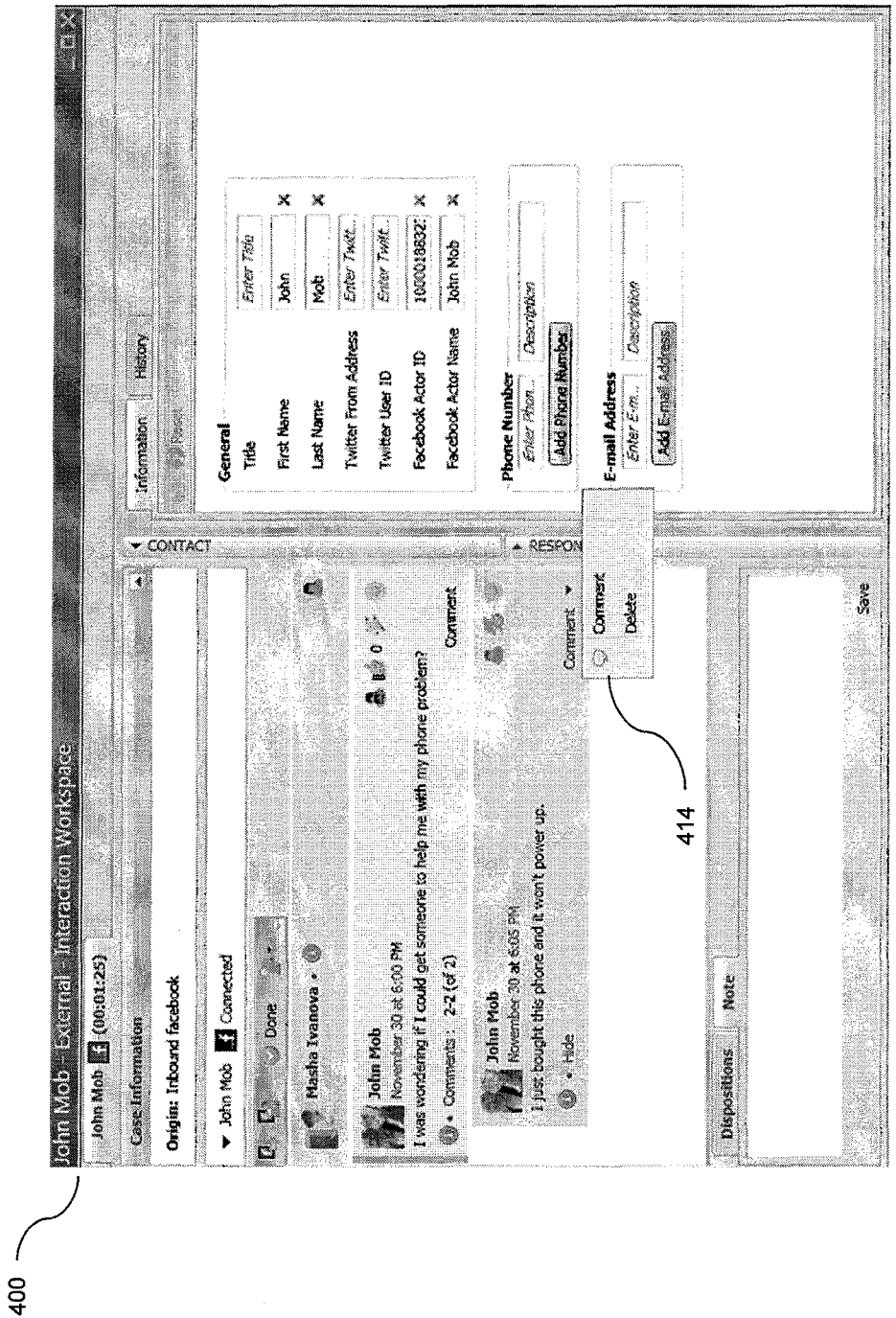
FIG. 4d is a screen shot of a GUI rendered upon delivery of a Facebook post to an agent's desktop, further depicting the capability for the agent to, for example, comment on the post or delete as may be necessary, according to an embodiment of the present invention.

FIG. 4d is a screen shot of a GUI 400 rendered upon delivery of a Facebook post to an agent's desktop 104, further depicting the capability for the agent to, for example, comment on the post or delete 414 as may be necessary, according to an embodiment of the present invention. When a comment is posted on a company's Facebook page, an agent may be able to delete the post if he/she determines it is inappropriate, off-topic, or spam.

Figure 4E:
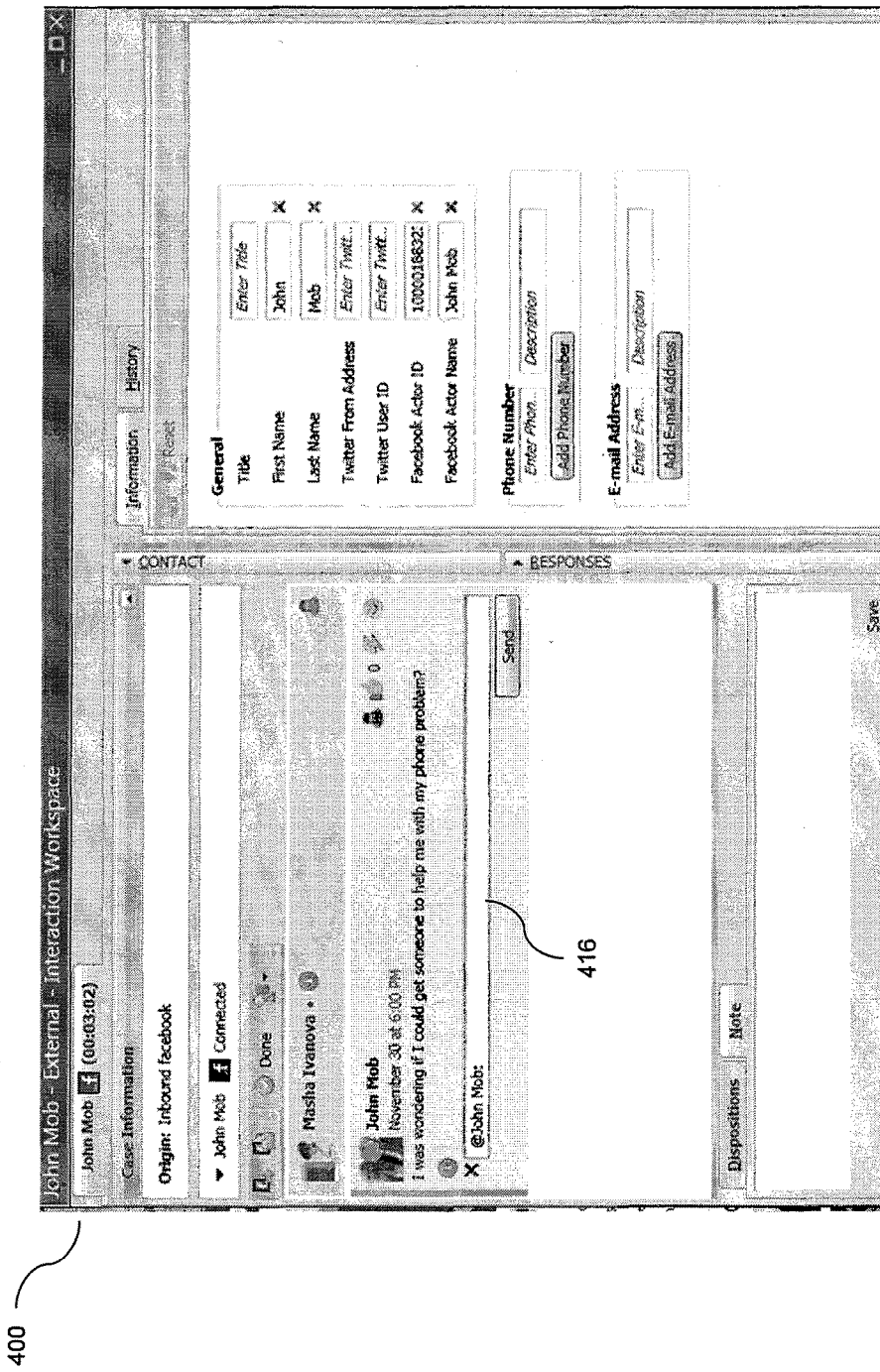
FIG. 4e is a screen shot of a GUI rendered upon delivery of a Facebook post to an agent's desktop, further depicting the text box that appears when an agent clicks the comment button, according to an embodiment of the present invention.

FIG. 4e is a screen shot of a GUI 400 rendered upon delivery of a Facebook post to an agent's desktop 104, further depicting the text box that appears when an agent clicks the comment button, according to an embodiment of the present invention. In this example, the text box automatically inserts the author's Facebook ID.

Figure 4F:
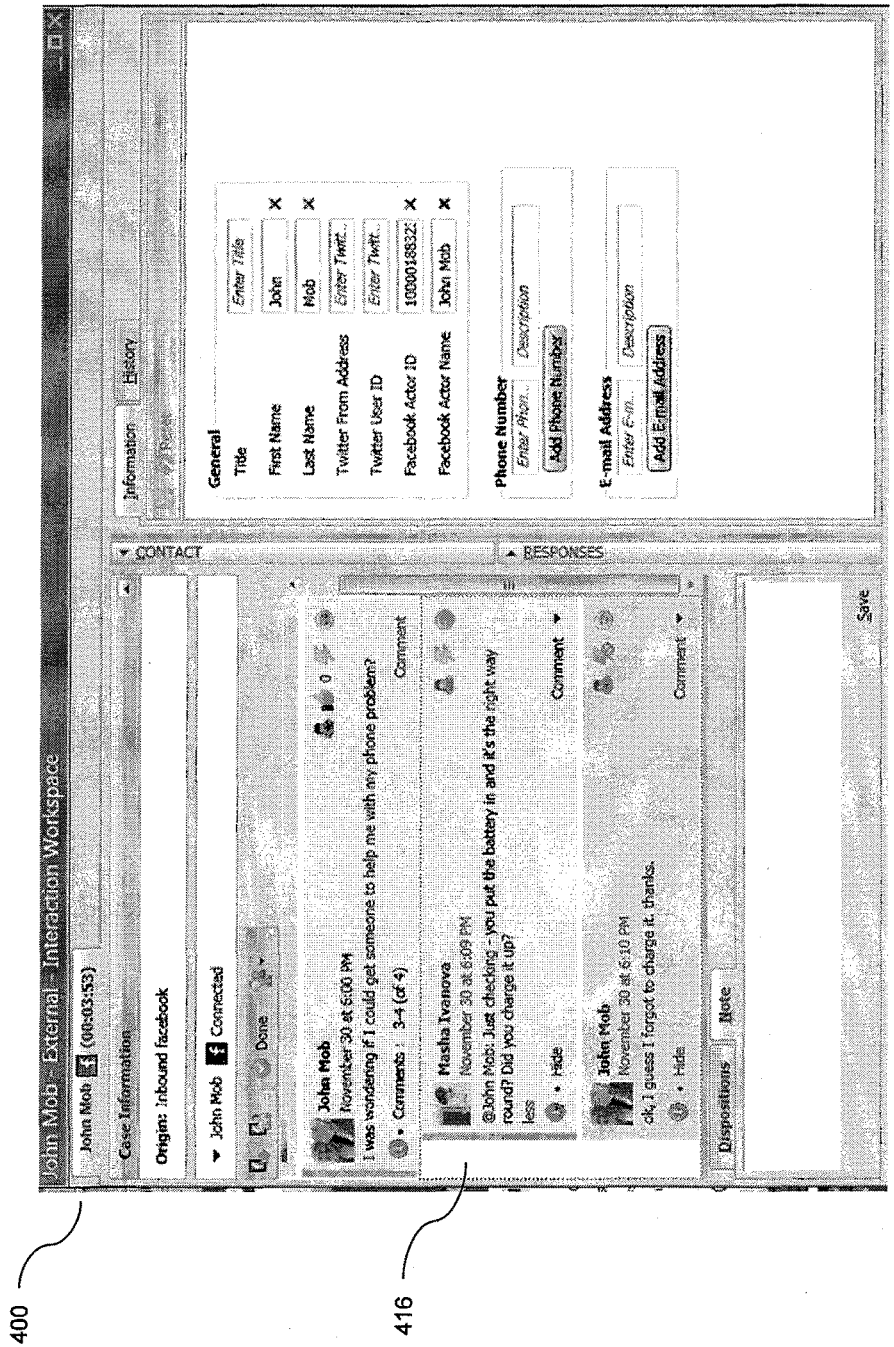
FIG. 4f is a screen shot of a GUI rendered upon delivery of a Facebook post to an agent's desktop, further depicting the capability to view a post's entire conversation thread, according to an embodiment of the present invention.

FIG. 4f is a screen shot of a GUI 400 rendered upon delivery of a Facebook post to an agent's desktop 104, further depicting the capability to view a post's entire conversation thread 416, according to an embodiment of the present invention. According to an embodiment, a conversation thread may consist of an initial post and any associated comments that were found during the polling period prior to assignment to an agent. According to another aspect, the conversation thread may update periodically (e.g. at each polling period) so long as an agent is actively assigned to the conversation. Consolidating related messages may avoid the situation that multiple agents work on replies to comments on the same post. According to an embodiment, different agents may be assigned to the various comments on the same post. In this example, an agent may comment on each of the Facebook users' responses separately leave a comment on the thread. Additionally, an agent may delete any of the comments as may be appropriate. As such an agent may in fact interact with more than one party.

Because some posts cannot be understood without context, in an embodiment of the present invention, a button on the desktop 104 may open the social site page or blog onto the agent's browser, or this may be done automatically as a screen pop.

According to an exemplary embodiment of the invention the agent's graphical user interface may provide access to the organization's enterprise knowledge base by, for example, providing content that may include standard processes and forms, support information, or product and service overviews. These documents may be shared via a URL (standard or shortened) through social sites.

According to an embodiment, the agent desktop 104 may provide access to a standard response library, which may provide common answers to common questions with personalization capabilities. The responses provided may include links to content, attachments, and Field Codes for personalization. Field codes may allow the customer's name or social ID to be automatically inserted along with many other values derived from CRM, customer databases, and/or other external repositories.

Cross-Channel Conversations with Context Aware Transition

According to an embodiment of the present invention, an agent may be able to engage in cross-channel communication with a post's author. For example, an inbound tweet could be responded to through short messaging system (SMS), a chat session, an email message, a voice call, or a post on another social media channel. Such a change or escalation of media may be desirable, for example, to exchange private information (e.g. account number, address information, etc.), to complete a purchase transaction, to clarify a complaint privately, to have a more extensive dialog without being restrained by channel-related constraints, or the like. In a typical scenario, the change of communication channel may be manually invoked by asking the customer to call in, send an email, or initiate a web chat from the company's web page. In so doing, the customer often has to manually change applications and/or devices and manually initiate the new interaction. This often results in a loss of connection to the previous interaction and therefore the customer is treated generically, i.e., given no special priority or chance of last agent routing and may face a potentially long queue time and have to repeat his/her identifying information to a newly assigned agent. Furthermore, the contact center may not be able to associate the prior social media communication to the current interaction over a different media channel due to a lack of access to the customer's social media identifier. Although social site APIs often do provide certain data on their users, such as the first and last name provided by the Twitter API and the full name provided by Facebook, that information may be inadequate for identifying the customer for a number of reasons: 1) a user may not have entered his/her real name and instead used a pseudonym (e.g. "Indiana Jones" or "Speed Racer") when signing up for the online social service; 2) a user may not have entered his/her name as it appears in the contact center database (e.g. entered "Joe" instead of "Joseph"); and 3) the contact center database may have more than one record with the same name (e.g. two "Joe Smith"s). Thus, the newly assigned agent may not have context of the earlier social media communication.

A system and method for cross-channel communication may allow an agent to initiate or invite a customer to a smooth transition from one medium to another while maintaining the connection to and the context of the original (or parent) interaction. According to one embodiment, an agent may send a customer a link (through a public or private message) to an application or service, which may include, for example, a web application, a mobile application, a cloud service, or the like. Such a link may, for example, point to a chat application, and an actuation of the link by the customer may initiate the chat dialog. An advantage of this approach may be that the customer may not need to download a specialized plugin or application to initiate the new session and the new session may launch in a browser window on the customer's device without the need for the customer to manually navigate to any particular contact page. Depending on the channels and application used the new interaction may even be established automatically by the application or service.

In addition to acting as a pointer, the link may contain parameters that provide reference to the parent interaction (such as, for example, the interaction identifier of the original tweet), the customer contact record, or any other record allowing the linking of this new (child) interaction to the customer and with the parent interaction to allow a full cross-channel conversational view. As such, the new interaction session may be initiated without the need for the customer to manually provide an identifier or authentication information that may otherwise be asked for in order to allow identification of any parent interactions over a social media channel.

The link parameters may be coded in the link, according to one embodiment, or the link may point to, for example, a record, a resource, a service, or the like, which provides the ability to refer to the customer record and/or parent interaction. The customer record may include, for example, the customer's profile information (such as name, phone number, contact number, email, or the like) and/or any previous interaction between the customer and the contact center, which may help provide context for the present interaction. Enabling the agent to effortlessly access this information may allow the agent to better and more expediently serve the customer.

According to one embodiment, the link including the additional parameters may be automatically generated by, for example, the interaction server 44, and may be made available to the agent through the interaction workspace in the form of an automated/standard response. When an agent decides to send a customer the link, he/she may simply select the link from the series of standard responses available through the standard response library. In another embodiment, an invoked routing strategy may automatically send the link to the customer in accordance with a business rule.

According to one embodiment, once the link is received by the customer (via, e.g. a private or public message), the customer may initiate a new interaction session by actuating (e.g. by clicking) the link. In one aspect, in response to the actuation of the link, the end user device 10 may be configured (e.g. via a web browser application hosted by the user device) to send a request for the new interaction to the media server 24. In one embodiment, the request may be accompanied by some or all of the additional parameters included in the invitation link. The interaction server 44 may process the new interaction request and use the accompanied additional information to identify, for example, the original (parent) interaction, the customer, and the agent who handled the original interaction. In one embodiment, the processing logic employed by the interaction server 44 may also treat the new interaction as a child of the original interaction and may link the child interaction to the customer's interaction history in the mass storage device 30. That is, even if the CRM database does not have stored therein the user ID used for the original social media interaction (e.g. Twitter handle, Facebook ID, etc.), the universal contact server 102 may, via information contained in the new interaction, associate the original interaction to a new interaction and maintain context of the conversation even in the new interaction channel. For example, the prior conversation conducted over the original channel may be displayed to the agent.

According to one embodiment, because the new interaction includes reference to the parent interaction, the new child interaction may be delivered to same agent/representative that handled the initial dialog with the customer (last agent routing), according to an embodiment of the present invention.

The interaction workspace of an agent's desktop 104 may allow the agent to, for example, view and edit (as may be appropriate) any relevant information related to the new interaction, such as the customer's profile information and interaction history.

In some scenarios it may be desirable to capture additional information from the customer (e.g. email address, customer number, account number, phone number, etc.) for cross validation or other purposes. This may be done by the agent requesting the input from the customer or may be done on an application/system level through an automated dialogue before the interaction is delivered to the agent. According to an embodiment, when the contact center is unable to correctly determine the identity of the customer, a new record may automatically be created in the customer relations management database. Once the customer clicks on the link to initiate, for example, a chat interaction, the customer may be asked for any other identifier (e.g. in a web form field or as part of an automated chat dialog). Such identifier could be the account number, phone number, email address or any identifier that can be mapped to an existing customer record. Upon receiving this information, the new and mapped records can be merged to show one contact across traditional and social channels.

In another embodiment, customer identification and authentication may be accomplished by using a third-party authentication routine. For example, a customer may be prompted to log in through one of his/her social site accounts (e.g. Facebook or Twitter account) and, after a successful login, may automatically be directed back to the child interaction (e.g. in this case, a chat session).

According to one embodiment of the present invention, the link that is sent to the customer may be encrypted and or shortened (e.g. by using a URL shortner) as may be necessary.

According to one aspect, the link may be associated with an expiration time and date. For example, a link to a chat session in response to a post on a company's Facebook wall may remain active for 15 minutes. An attempt by a customer to access the link after its expiration date may prompt a message to the customer to contact the organization via a preset method (e.g. contacting customer service through a 1-800 number). Similarly, a link may have a limitation as to how many times it may be used to allow control over usage, according to an embodiment of the present invention. When a customer accesses a link, prior to establishing the child interaction, the expiration date and/or usage counter may be checked to prevent misuse.

A person of ordinary skill in the art will recognize that while the above description provides examples for cross-channel communication from Twitter and Facebook to chat, this feature is not limited to a particular media type or channel.

FIGS. 5a-5f are screen shots of a Twitter user's desktop view and the interaction workspace GUI accessible by a contact center agent for engaging the user through cross-channel communication. For purpose of simplicity in illustration, it is assumed that the Twitter user, Lara Senders, is a follower of the organization with Twitter ID@TheBrandCS.

Figure 5A:
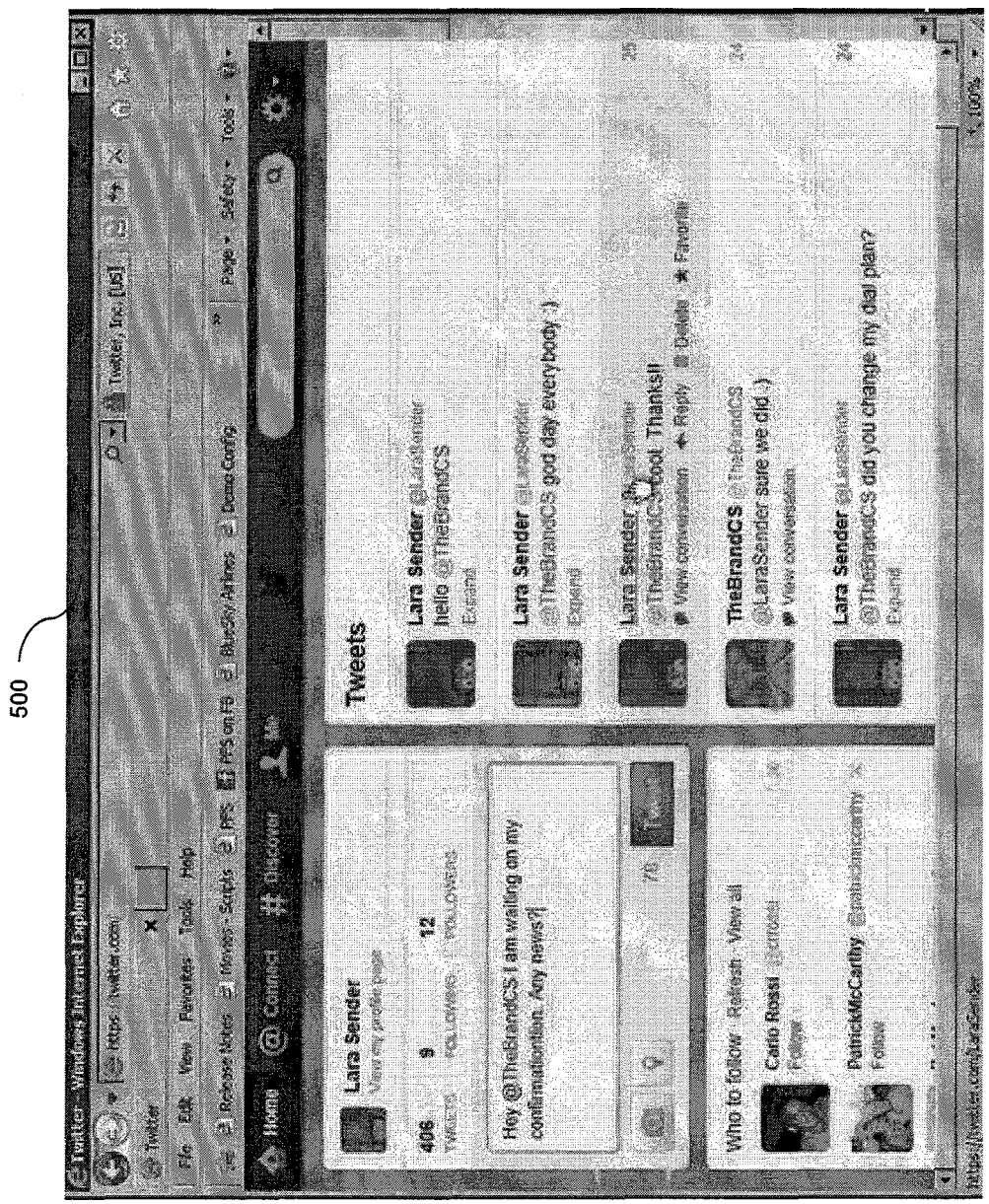
FIG. 5a is a dual view of a Twitter user's desktop and an agent's GUI rendered upon delivery of a Twitter post to an agent's desktop, according to an exemplary embodiment of the present invention.

FIG. 5a is an exemplary view of a Twitter user's desktop 500 prior to her tweeting a message that mentions the organization.

Figure 5B:
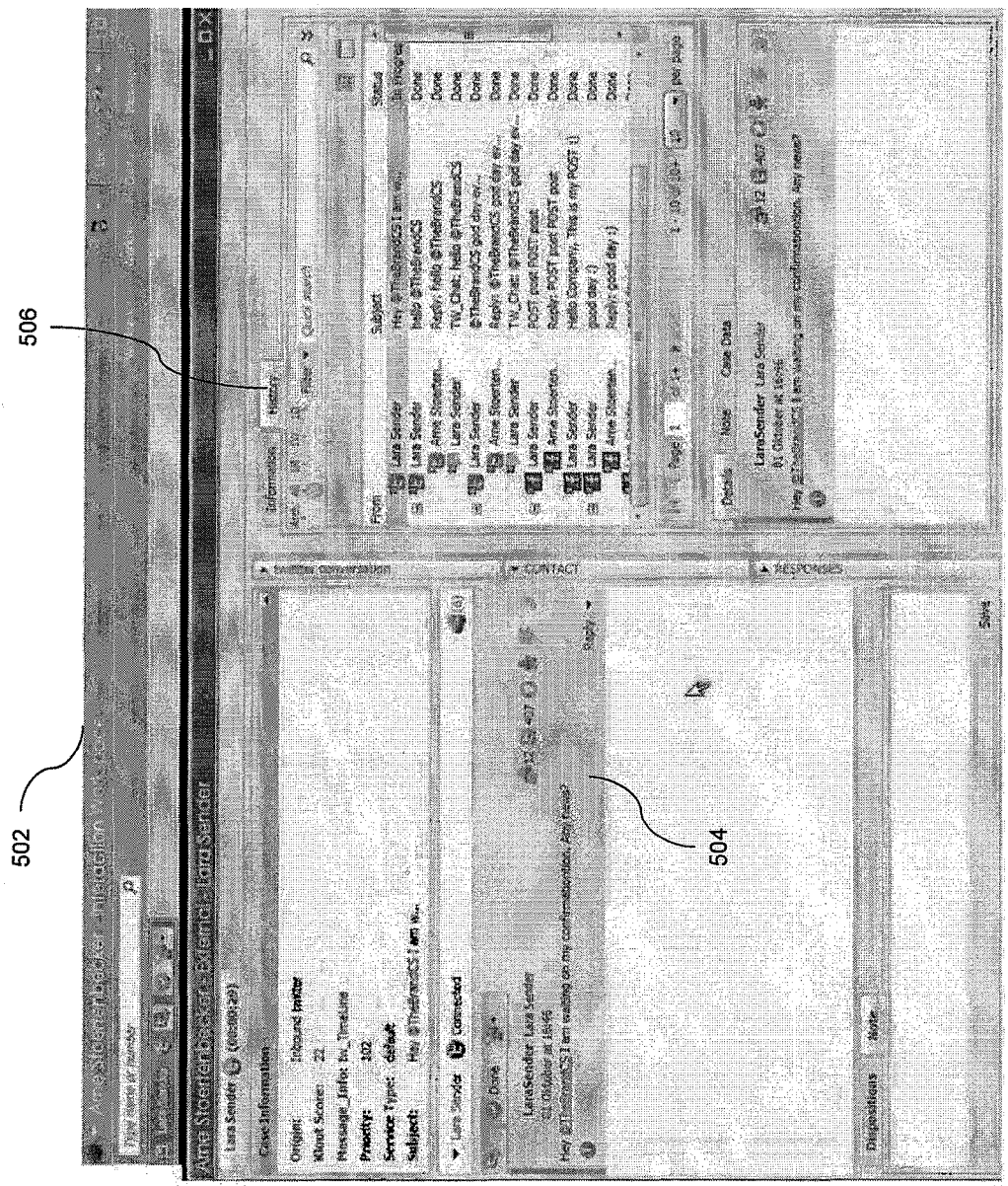
FIG. 5b is a dual view of a Twitter user's desktop and an agent's GUI rendered upon delivery of a Twitter post to an agent's desktop, further depicting the agent sending the user a link to initiate a chat session, according to an exemplary embodiment of the present invention.

FIG. 5b is a view of an agent's GUI 502 rendered upon delivery of a Twitter post to the agent's desktop 104, according to an embodiment of the present invention. In this example, the Twitter post by the user appears in the agent's interaction workspace 504. The user's profile information and historical view 506 of all previous interactions with the contact center may be readily accessible to the agent.

Figure 5C:
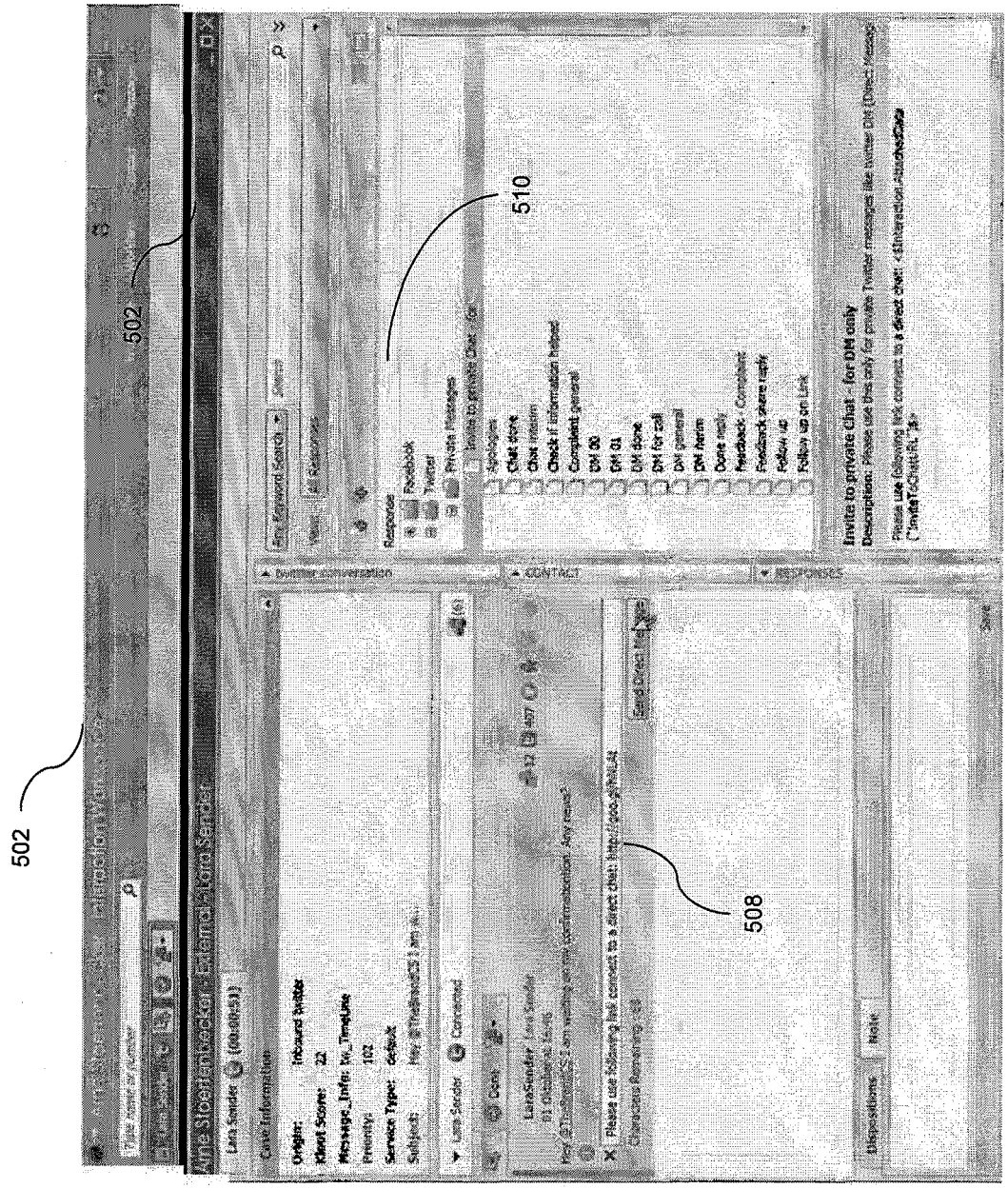
FIG. 5c is a dual view of a Twitter user's desktop and an agent's GUI rendered upon initiating a chat session, according to an exemplary embodiment of the present invention.

FIG. 5c is a view of an agent's GUI 502 rendered upon delivery of a Twitter post to an agent's desktop 104, further depicting the agent sending the user a link to initiate a chat session, according to an embodiment of the present invention. In this example, the agent retrieves a standard format response 508 from the standard response library 510 for inviting the customer to a direct chat and sends it directly to the user.

Figure 5D:
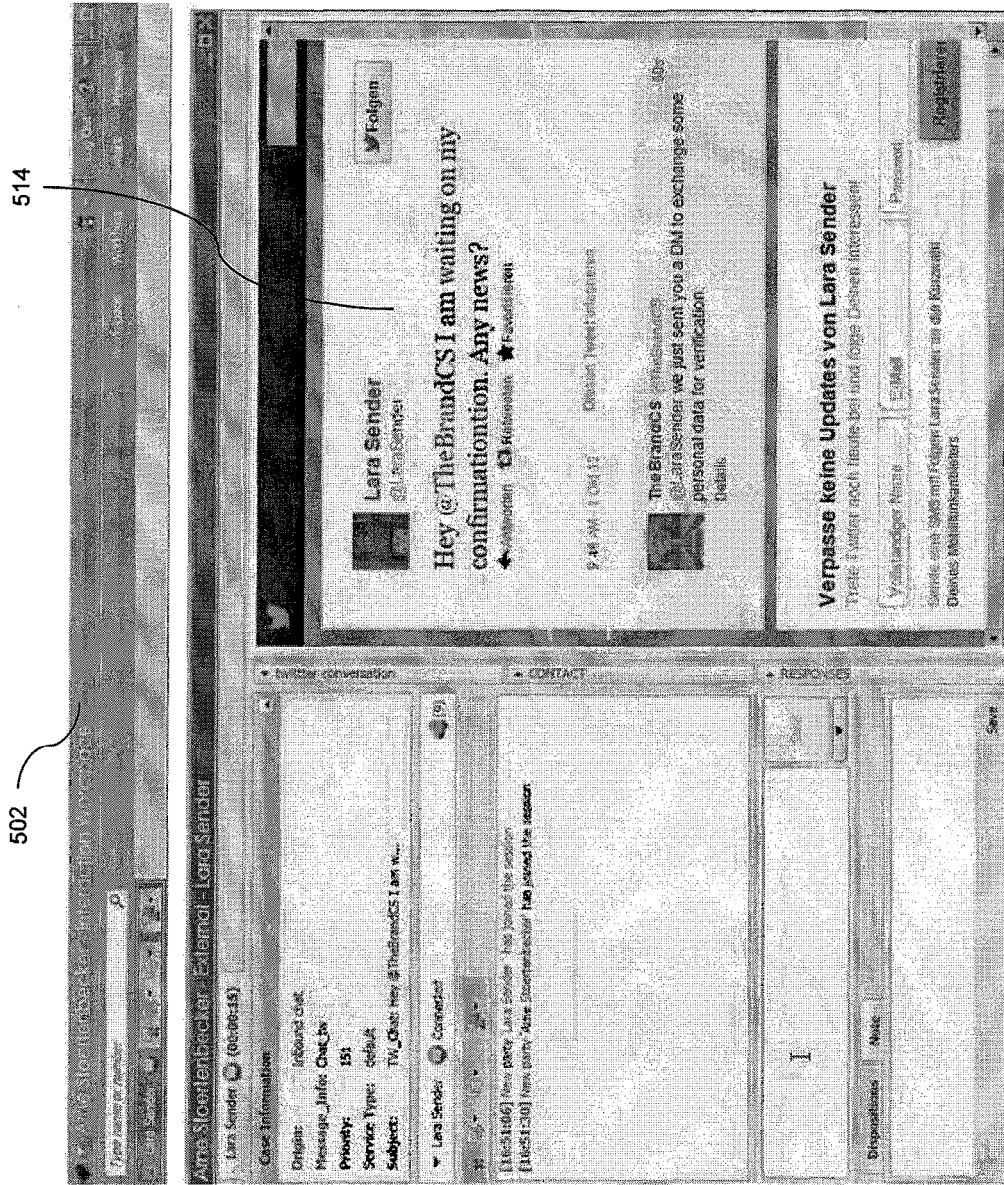
FIG. 5d is a dual view of a Twitter user's desktop and an agent's GUI rendered while engaging the user through a chat session, according to an exemplary embodiment of the present invention.

FIG. 5d is a view of an agent's GUI 502 rendered upon delivery of a chat interaction to an agent's desktop 104, further depicting the capability of the interaction workspace to display the original tweet and the agent's response as would appear in a Twitter interface 514, according to an embodiment of the present invention. Additionally, clicking on a #hashtag may open a list of messages with the hashtag in Twitter and, similarly, clicking on an @mention may display the profile of the Twitter user association with the @mention in Twitter.

Figure 5E:
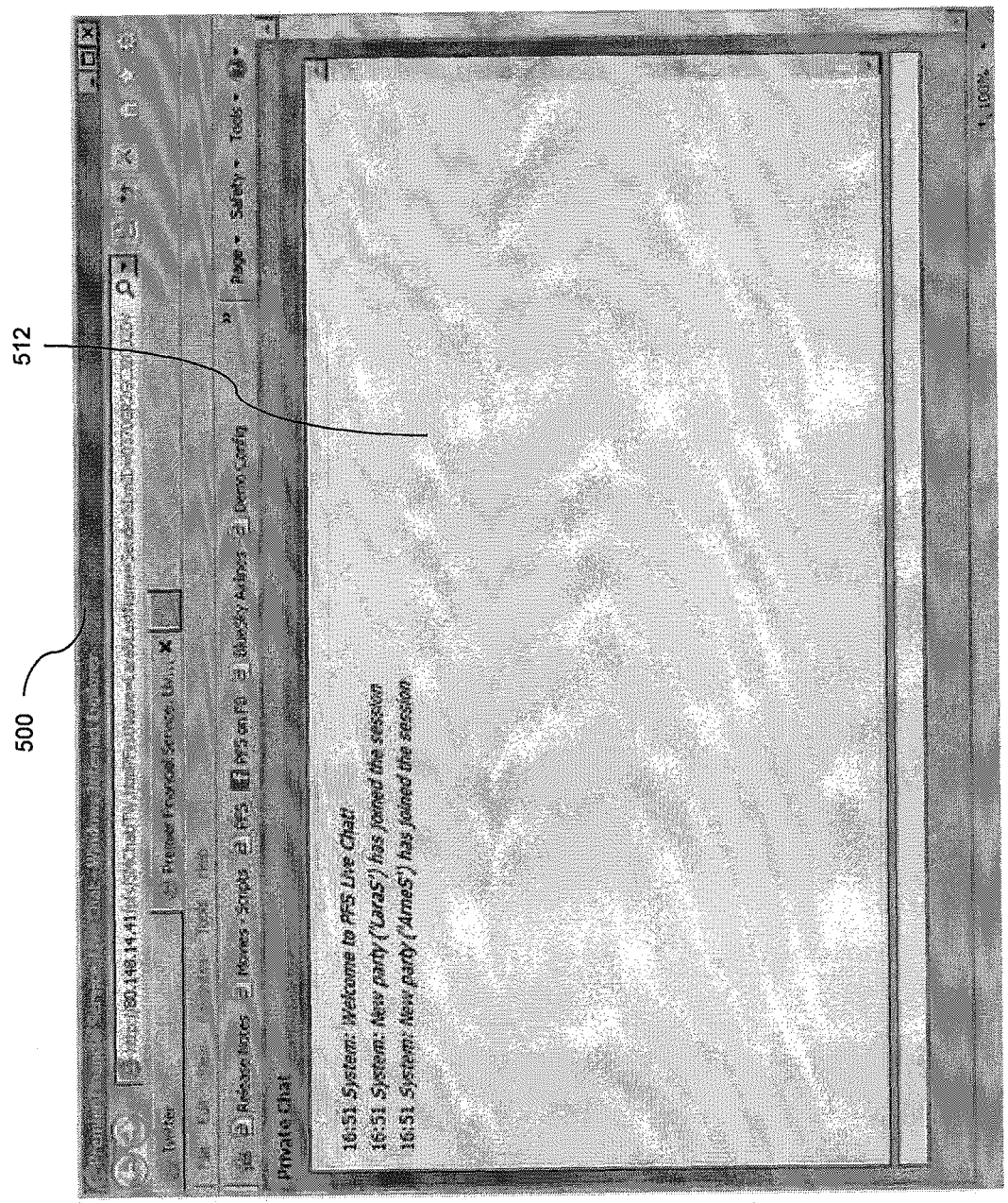
FIG. 5e is an exemplary view of a Twitter user's desktop rendered upon initiating a chat session, according to an embodiment of the present invention.

FIG. 5e is an exemplary view of a Twitter user's desktop 500 rendered upon initiating a chat session, according to an embodiment of the present invention. In this example, a private chat session 512 is initiated upon the user clicking on the link that was provided by the agent.

Figure 5F:
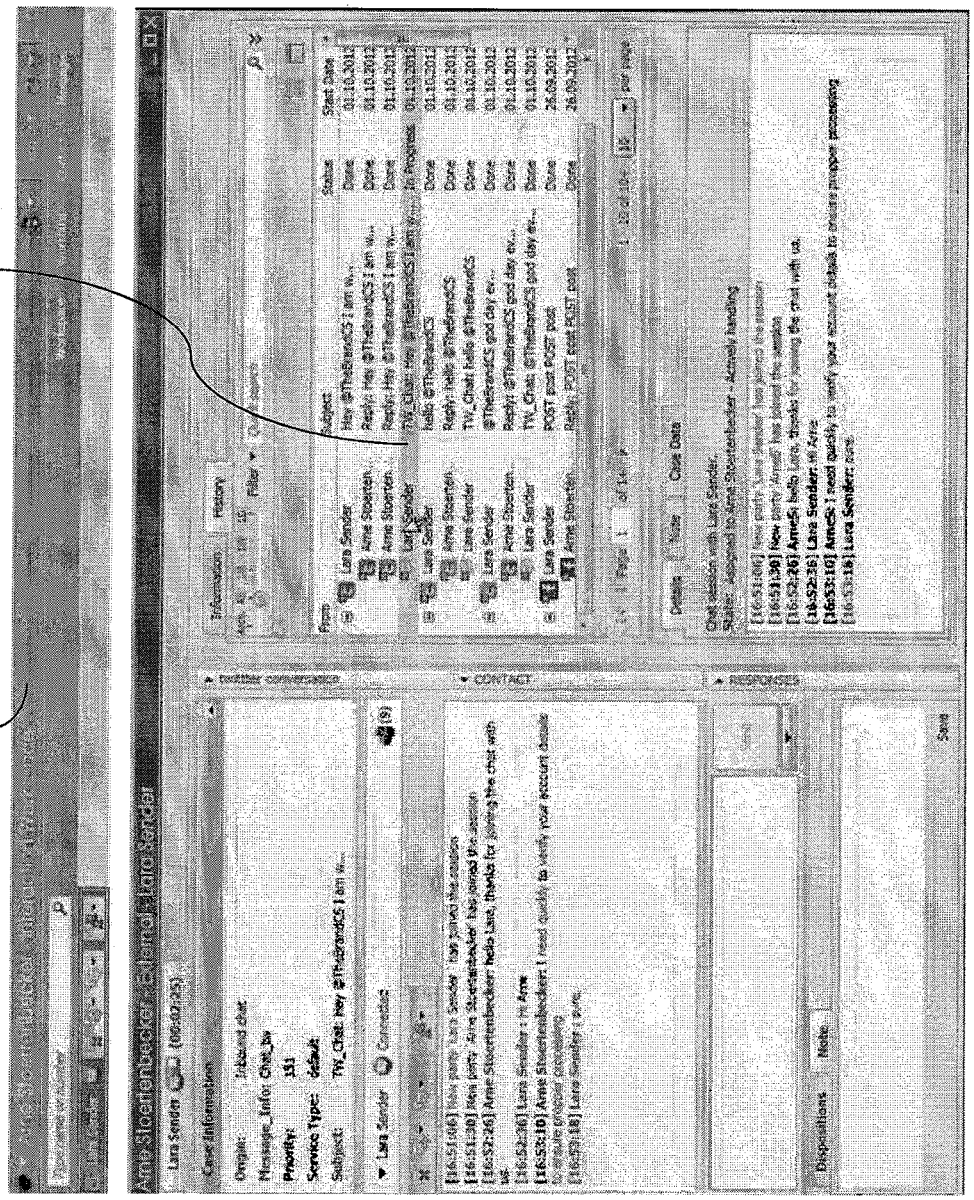
FIG. 5f is a view of an agent's GUI rendered while engaging the user through a chat session, according to an embodiment of the present invention.

FIG. 5f is a view of an agent's GUI 502 rendered while engaging the user through a chat session, according to an embodiment of the present invention. In this example, the agent requests that the user verify her account details to ensure proper processing. Upon initiating the chat session, this interaction 516 is automatically linked to the Twitter post-and-response parent interaction. As illustrated, this new interaction is threaded underneath the parent interaction in the customer contact history.

Figure 6A:
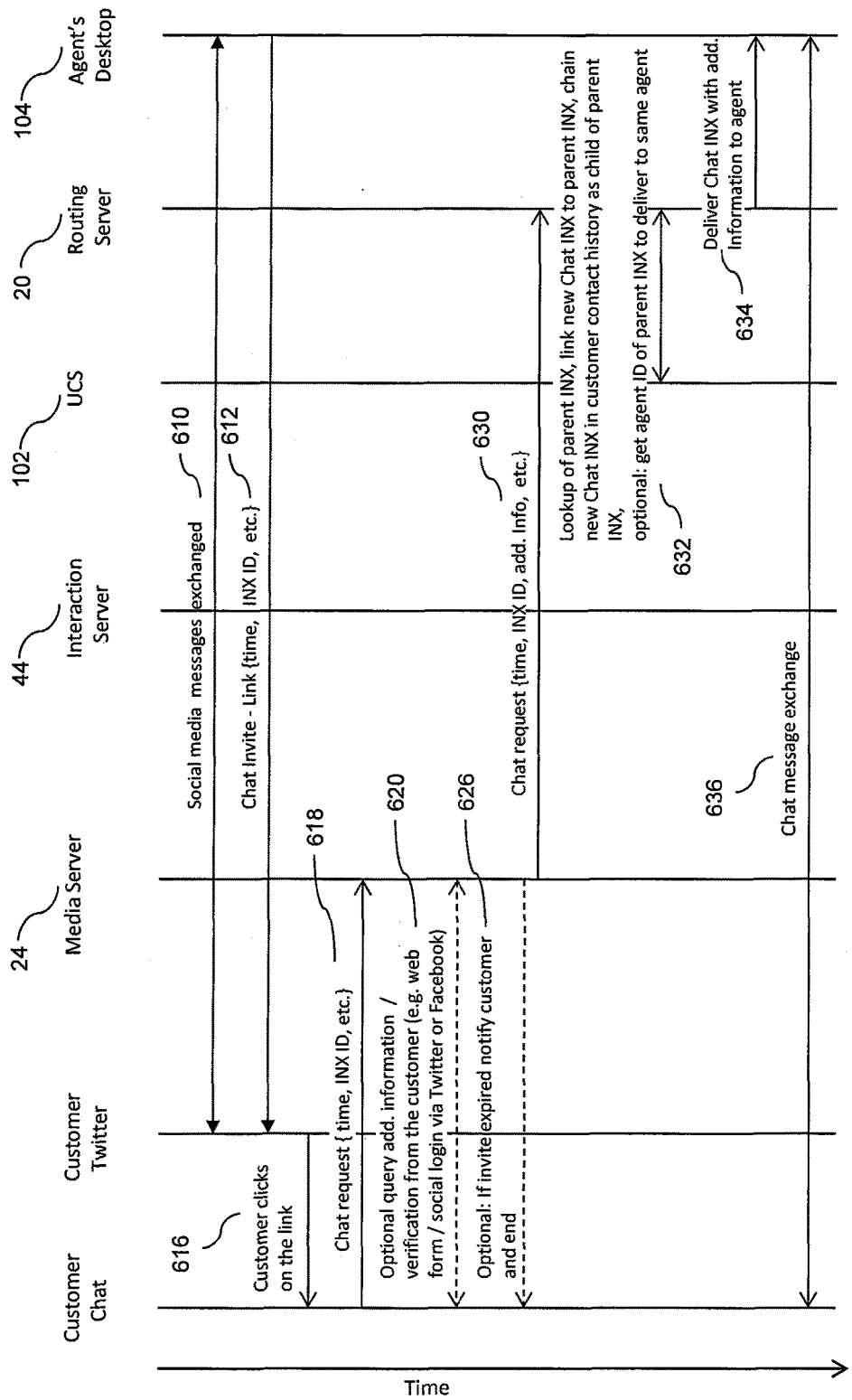
FIG. 6a is an exemplary flow of message exchanges between various components involved in switching conversation from a social media channel to another communication channel, according to one embodiment of the present invention.
Figure 6B:
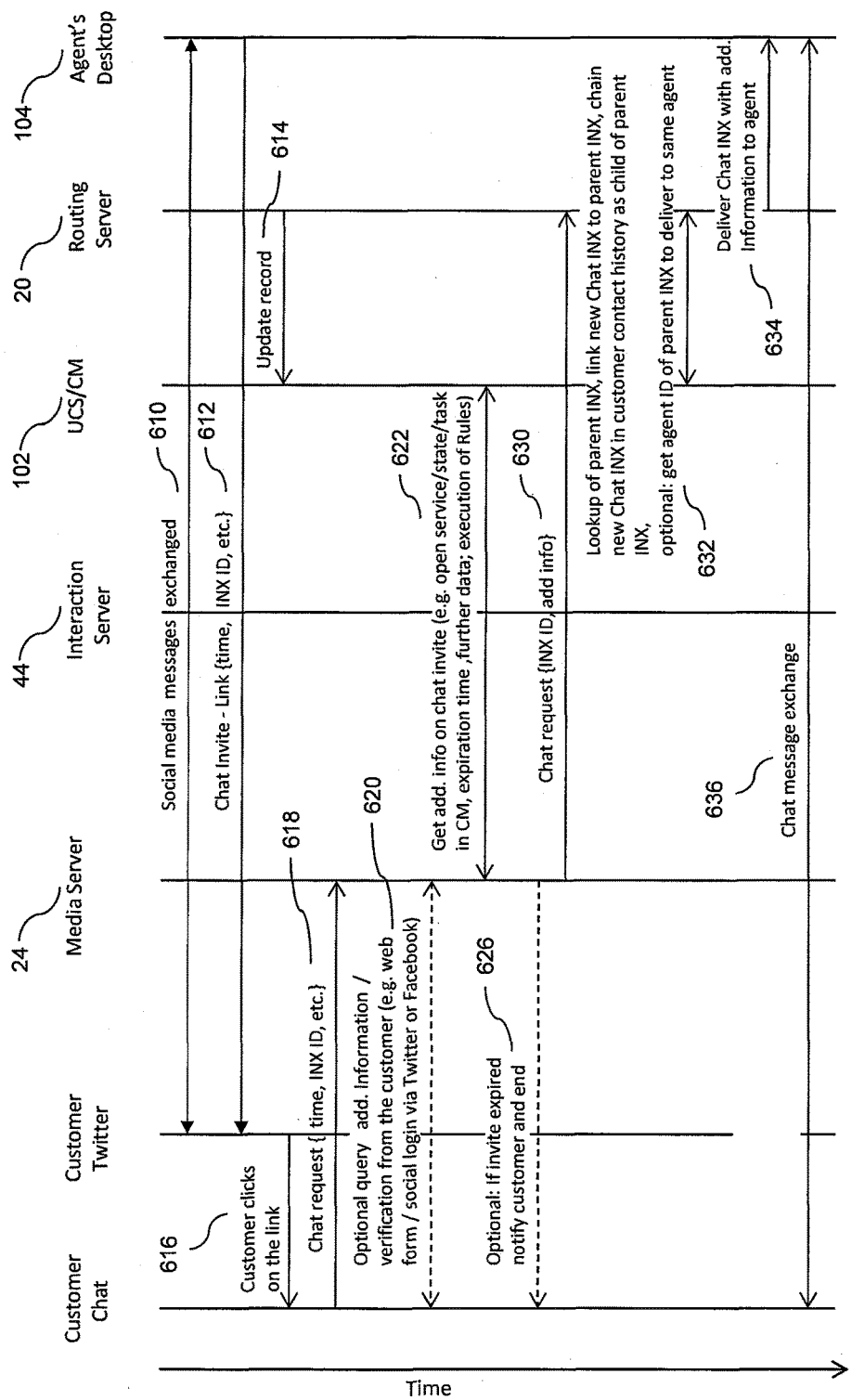
FIG. 6b is an exemplary message flow that may occur in order to escalate a social message exchange over Twitter to a private chat session, according to one embodiment of the present interaction.
Figure 6C:
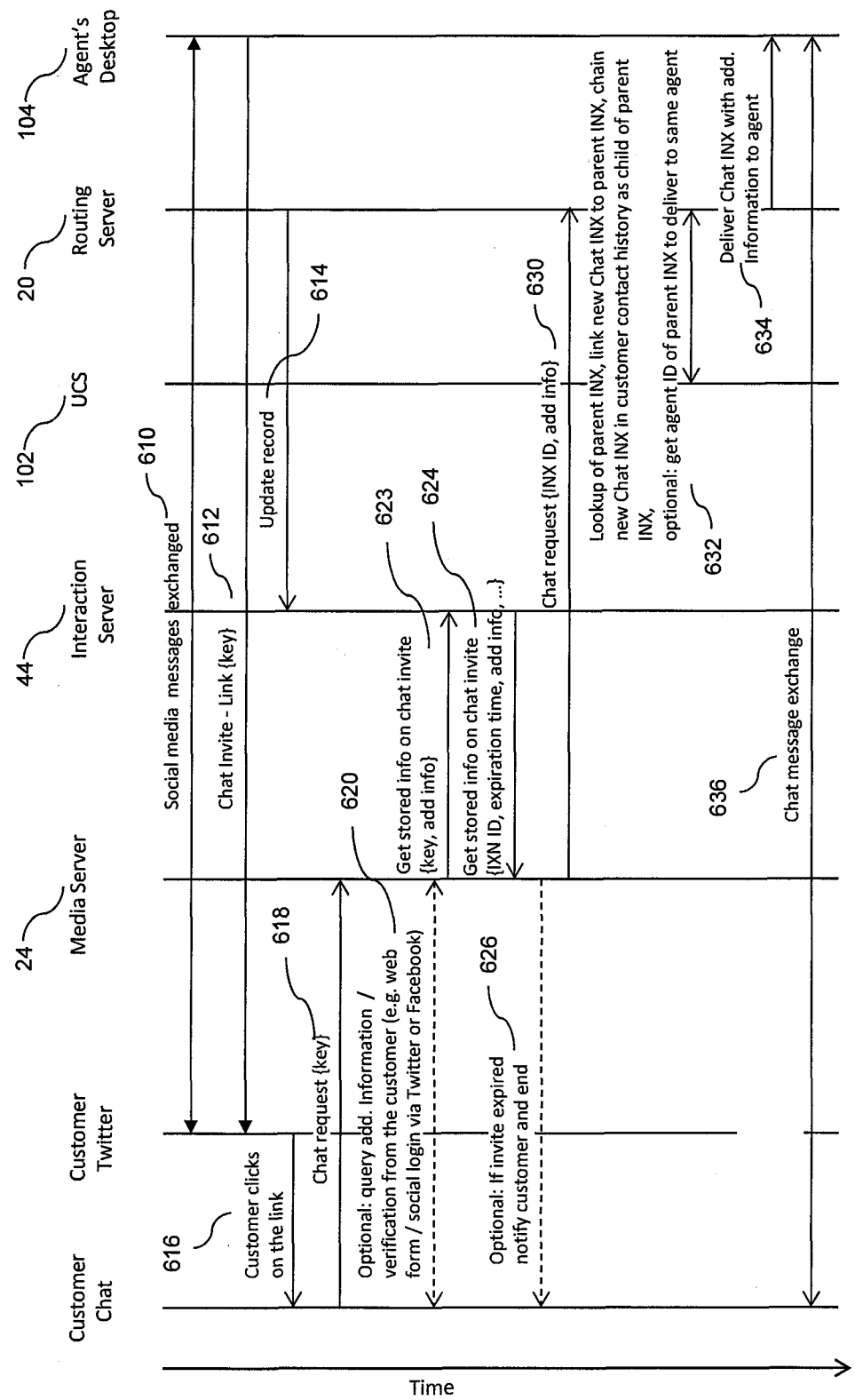
FIG. 6c is an exemplary message flow that may occur in order to escalate a social message exchange over Twitter to a private chat session, further demonstrating the use of other information that may be transmitted along with a link to identify interactions, according to one embodiment of the present interaction.

FIGS. 6a-6c are exemplary flows of message exchanges between various components involved in switching a conversation from a social media channel to another communication channel, according to some embodiments of the present invention. For illustration purposes, in this series of examples, it is assumed that the agent and customer initially engage in a social media message exchange via Twitter (by, for example, posting Twitter messages with @mentions), but subsequently escalate the dialogue to a chat session. However, as a person of ordinary skill in the art will appreciate, the proceeding exemplary processes are substantially applicable to cross-channel communication between any two media channels.

In the message flow of FIG. 6a, in step 610, the customer and agent exchange social messages over Twitter.

In step 612, the agent invites the customer to a chat session by, for example, sending the customer a link/reference via a private message (e.g. a Twitter message mentioning the customer) or a public post accessible by any Twitter user. The link may be, for example, a hyperlink or any other word, symbol, image, or element that references data which may be followed automatically. In addition to pointing to a chat session, the link may be encoded with additional parameters that may include, for example, the interaction ID of the initial tweet exchange (parent interaction), a time stamp indicating when the invitation was sent out, and the like. According to one embodiment, the link/invitation may also have an associated access limitation such as an expiration period and/or a maximum use limitation.

In step 616, the customer actuates the link provided by the agent, which may prompt a browser window (such as window 512 of FIG. 5e) to open on the customer's desktop establishing a new connection between the customer's browser and the media server 24.

In step 618, the browser may send the media server 24 a chat request, which may include any of the parameters that may have been encoded in the invitation such as the parent interaction identifier or time stamp.

In step 620, the media server may optionally prompt the customer for additional information. This information may be used to authenticate the customer by, for example, requesting verification information, such as name, phone number, email, or the like, from the customer and cross-checking that against existing records for that customer in the CRM database. Authentication may also occur through a third-party service by, for example, asking the customer to login to a social site, such as Twitter or Facebook, and relying on the response from the social site's API as to whether or not the login attempt was successful. If the login was in fact successful, the process may proceed to step 626; otherwise, the customer may be notified of the failure to authenticate and be prompted to, for example, provide verification information through a web form, or another prescribed method. The additional information requested at this step may also be used to supplement the customer's contact records at the contact center. For example, a contact center may not have the social identifier of the customer with whom it is engaged in social communication, and by asking the customer for his/her full name, phone number, email, or other identifying information, the contact center may be able to pair the detected social identifier of the customer with a preexisting record in the UCS/CS.

In step 626, the media server 24 may check whether or not the invitation/access link has expired, which may occur if, for example, the link's expiration period has passed (as may be readily gauged from the time stamps of the chat invitation and the chat request) and/or the access request exceeds the maximum number of times the link may be called. If the link has expired, the media server 24 may notify the customer that a chat session may not be initiated and may direct the customer to contact the contact center via a preset method, such as calling a 1-800 number. If the link has not expired, in step 630, the media server 24 forwards the chat request to the routing server 20.

In step 632, the routing server may query the universal contact server 102 to identify the parent interaction (which the chat request points to) and proceed to link the new chat interaction as a child of the parent in the customer contact history maintained by the UCS 102. The routing server 20 may attach this and other relevant information (such as customer's contact information, interaction history) to the chat interaction. According to one embodiment, the routing server 20 may also obtain the identity of the agent who handled the parent interaction and route the chat interaction to the same agent.

In step 634, the routing server 20 delivers the chat interaction along with any attached information to the agent's desktop 104.

In step 636, the agent and customer may engage in a dialogue over a chat session.

According to one embodiment, the process above may be executed without executing steps 620 and 626.

FIG. 6b demonstrates the message flow that may occur in order to escalate a social message exchange over Twitter to a private chat session, according to an embodiment of the present interaction. The message flow 602 provided in this example is substantially similar to flow 600 of FIG. 6a with the exception of the additional steps below:

In step 614, subsequent to the agent sending the customer an invitation to join a private chat session in step 612, the routing server 20 may update the customer's interaction records at the UCS 102 and/or open a "service" (or "state" or "task") in a conversation manager (CM) for a chat session associated with the customer. The CM may be deployed as a stand-alone server or as part of the UCS 102, and used for contextual data storage for maintaining records of ongoing services at the contact center, which may include, for example, an outgoing campaign to reach out to a select group of customers for sales promotion or to conduct surveys.

In step 622, subsequent to the media server 24 receiving the chat request from the customer in step 618 and any customer verification that may ensue in step 620, the media server 24 may query the UCS 102 and/or the CM for any additional information associated with the chat invitation used in processing the interaction. For example, the UCS 102 may provide the contact information of the customer, the customer's interaction history, any business rules (processes) associated with the customer, and/or an expiration time associated with the chat invitation. The conversation manager may, for example, provide information on open services associated with the customer. For example, an open service may be an outgoing campaign to reach out to select customers to notify them of a promotional sale. In this case, it would be beneficial to inform the agent who is assigned to the chat interaction of this open service as he/she may be able to discuss the promotional sale with the customer during the chat dialogue.

FIG. 6c demonstrates the message flow that may occur in order to escalate a social message exchange over Twitter to a private chat session, further demonstrating the use of other information that may be transmitted along with a link to identify interactions, according to an embodiment of the present interaction. The message flow 604 provided in this example is substantially similar to the flow 600 of FIG. 6a except for differences appearing in the steps below:

In step 612, the chat link that is sent to the customer may be encoded with information, such as, for example, a unique key. The unique key may be used, for example, to identify the source interaction. According to an embodiment, the key may, for example, be a multi-digit number. According to an embodiment, keys may be stored in a database table stored in the mass storage device 30. The database table may associate each key with other identifying parameters such as interaction ID, time stamp, etc. In step 614, the routing server 20 may create a database entry for the key encoded in the chat link in the interaction server 44.

In step 623, subsequent to the media server 24 receiving a chat request (along with the chat invitation key) from the customer in step 618 and any customer verification that may ensue in step 620, media server 24 may query the interaction server for the identifying information associated with the key. In step 624, the interaction server may identify the stored information related to the key from the database table and forward that information to the media server 24. The identifying information may be attached to the chat request before forwarding the request to the routing server in step 630.

As this invention has been described herein by way of exemplary embodiments, many modifications and variations will be apparent to those skilled in the art. Accordingly, it is to be understood that the invention described herein may be embodied other than as specifically described herein. For example, although the above examples for cross-channel communication focus on transitioning conversation from a social media channel to a non-social media channel, a person of skill in the art should recognize that embodiments of the present invention may also be applied in transitioning conversation from any two media channels.

What is claimed is:

1. A method for prioritizing processing of interactions and routing prioritized interactions at a contact center, the method comprising:
   generating, by a processor associated with the contact center, an interaction to be prioritized for processing, the interaction being based on data received over a data network via a media channel associated with the contact center;
   identifying, by the processor, a person associated with the interaction;
   identifying, by a processor, an influence level of the person associated with the interaction;
   identifying, by the processor, actionability of the interaction by performing pattern matching against an actionable model and a non-actionable model, wherein the interaction is identified as actionable in response to identifying the interaction as calling for a response by the contact center, and non-actionable in response to identifying the interaction as not calling for a response by the contact center; and
   prioritizing, by the processor, the interaction for processing based on the actionability of the interaction and the influence level of the person associated with the interaction,
   wherein the prioritizing comprises:
      in response to identifying the actionability of the interaction as actionable, ignoring, by the processor, the interaction in response to the influence level being below a first threshold; and
      in response to identifying the actionability of the interaction as non-actionable, distributing, by the processor, the interaction to an agent device in response to the influence level being above a second threshold, the second threshold being greater than or equal to the first threshold, wherein the distributing the interaction to the agent device comprises:
         transmitting, by the processor, a link to an end user device of the person associated with the interaction, the link being configured to initiate a new interaction session; and initiating, by the processor, the new interaction session between the agent device and the end user device, in response to actuation of the link.

2. The method of claim 1, wherein the interaction is a message posted on a social media channel.

3. The method of claim 2, wherein the person associated with the interaction is an author of the message.

4. The method of claim 1, wherein the influence level is based on a size of the person's online social media network.

5. The method of claim 4, wherein the size of the person's online social media network is based on a number of people directly or indirectly connected to the person via the online social media network.

6. The method of claim 1, wherein the prioritizing is further based on one or more of a sentiment of the interaction or a business value of the person associated with the interaction.

7. A method for distributing interactions to contact center agents of a contact center, the method comprising:
- generating, by a processor associated with the contact center, an interaction to be distributed to one of the contact center agents, the interaction being based on data received over a data network via a media channel associated with the contact center;
- identifying, by the processor, a person associated with the interaction;
- identifying, by the processor, an influence level of the person associated with the interaction;
- identifying, by the processor, actionability of the interaction by performing pattern matching against an actionable model and a non-actionable model, wherein the interaction is identified as actionable in response to identifying the interaction as calling for a response by the contact center, and non-actionable in response to identifying the interaction as not calling for a response by the contact center; and
- prioritizing, by the processor, the interaction for processing based on the actionability of the interaction and the influence level of the person associated with the interaction,
- wherein the prioritizing comprises:
  - in response to identifying the actionability of the interaction as actionable, ignoring, by the processor, the interaction in response to the influence level being below a first threshold; and
  - in response to identifying the actionability of the interaction as non-actionable:
    - identifying, by the processor, one or more contact center agents; and
    - distributing, by the processor, the interaction to an agent device of the one of the one or more contact center agents in response to the influence level being above a second threshold, the second threshold being greater than or equal to the first threshold, wherein the distributing the interaction to the agent device comprises:
      - transmitting, by the processor, a link to an end user device of the person associated with the interaction, the link being configured to initiate a new interaction session; and
      - initiating, by the processor, the new interaction session between the agent device and the end user device, in response to actuation of the link.

8. The method of claim 7, wherein the interaction is a message posted on a social media channel.

9. The method of claim 8, wherein the person associated with the interaction is an author of the message.

10. The method of claim 7, wherein the influence level is based on a size of the person's online social media network.

11. The method of claim 10, wherein the size of the person's online social media network is based on a number of people directly or indirectly connected to the person via the online social media network.

12. The method of claim 7, wherein the distributing further comprises distributing, by the processor, the interaction to an agent in a first agent group when the influence level is equal to or higher than a preset threshold, and to an agent in a second agent group when the influence level is below the preset threshold.

13. The method of claim 7, wherein the distributing is further based on one or more of a sentiment of the interaction or a business value of the person associated with the interaction.

14. A system for prioritizing interactions and distributing interactions to contact center agents, the system including:
- a media channel configured to receive data over a data network;
- a processor; and
- a memory, wherein the memory has stored thereon instructions that, when executed by the processor, cause the processor to:
  - generate an interaction to be prioritized for processing based on the data received by the media channel;
  - identify an interaction to be prioritized and distributed to a contact center agent;
  - identify a person associated with the interaction;
  - identify an influence level of the person associated with the interaction;
  - identify actionability of the interaction by performing pattern matching against an actionable model and a non-actionable model, wherein the interaction is identified as actionable in response to identifying the interaction as calling for a response by the contact center, and non-actionable in response to identifying the interaction as not calling for a response by the contact center; and
  - identify one or more contact center agents; and
  - prioritize the interaction for distribution based on the actionability of the interaction and the influence level of the person associated with the interaction,
  - wherein the prioritizing comprises:
    - in response to identifying the actionability of the interaction as actionable, ignoring the interaction in response to the influence level being below a first threshold; and
    - in response to identifying the actionability of the interaction as non-actionable distribute the interaction to an agent device of the one of the one or more contact center agents, in response to the influence level being above a second threshold, the second threshold being greater than or equal to the first threshold, wherein the distributing the interaction to the agent device comprises:
      - transmitting, by the processor, a link to an end user device of the person associated with the interaction, the link being configured to initiate a new interaction session; and
      - initiating, by the processor, the new interaction session between the agent device and the end user device, in response to actuation of the link.

15. The system of claim 14, wherein the interaction is a message posted on a social media channel.

16. The system of claim 15, wherein the person associated with the interaction is an author of the message.

17. The system of claim 14, wherein the influence level is based on a size of the person's online social media network.

18. The system of claim 17, wherein the size of the person's online social media network is based on a number of people directly or indirectly connected to the person via the online social media network.

19. A method for prioritizing processing of interactions and routing prioritized interactions at a contact center, the method comprising:
   generating, by a processor associated with the contact center, an interaction to be prioritized for processing, the interaction being based on data received over a data network via a media channel associated with the contact center;
   identifying, by the processor, a person associated with the interaction;
   identifying, by the processor, an influence level of the person associated with the interaction; and
   prioritizing, by the processor, the interaction for processing based on the influence level of the person associated with the interaction,
      wherein the prioritizing further comprises distributing, by the processor, the interaction to an agent device of a first agent of a plurality of contact center agents in response to the influence level being equal to or higher than a second threshold, and to an agent device of a second agent of the plurality of contact center agents in response to the influence level being below the second threshold, wherein the distributing the interaction to the agent device comprises:
         transmitting, by the processor, a link to an end user device of the person associated with the interaction, the link being configured to initiate a new interaction session; and
   initiating, by the processor, the new interaction session between the agent device and the end user device, in response to actuation of the link.

* * * * *